United States Patent
Tarkoma et al.

(10) Patent No.: US 8,046,429 B2
(45) Date of Patent: Oct. 25, 2011

(54) SERVICE MOBILITY FOR COMPOSED COMPONENTS

(75) Inventors: Sasu Tarkoma, Espoo (FI); Christian Prehofer, Espoo (FI)

(73) Assignee: Nokia Corporation (FI)

( * ) Notice: Subject to any disclaimer, the term of this patent is extended or adjusted under 35 U.S.C. 154(b) by 1130 days.

(21) Appl. No.: 11/767,677

(22) Filed: Jun. 25, 2007

(65) Prior Publication Data

US 2008/0320497 A1 Dec. 25, 2008

(51) Int. Cl.
*G06F 15/16* (2006.01)
(52) U.S. Cl. ......... 709/217; 709/219; 709/226; 709/229
(58) Field of Classification Search .................. 709/217, 709/219, 226, 229
See application file for complete search history.

(56) References Cited

U.S. PATENT DOCUMENTS 7,210,131 B2 * 4/2007 Schmidt et al. ............... 717/137
7,574,524 B2 * 8/2009 Bantz et al. ................... 709/238

OTHER PUBLICATIONS

"The Ninja Architecture for Robust Internet-Scale Systems and Services," by Steven D. Gribble, Matt Welsh, Rob von Behren, Eric A. Brewer, David Culler, N. Borisov, S. Czerwinski, R. Gummadi, J. Hill, A. Joseph, R.H. Katz, Z.M. Mao, S. Ross, and B. Zhao. The University of California at Berkley.
"Actively Deployable Mobile Services for Adaptive Web Access," Siu Nam Chuang, Alvin T.S. Chan, Jiannong Cao, Ronnie Cheung, IEEE Internet Computing, Mar./Apr. 2004 (vol. 8, No. 2) pp. 26-33.
"Efficient Content-based Routing, Mobility-aware Topologies, and Temporal Subspace Matching," Sasu Tarkoma, Doctoral dissertation, University of Helsinki, Faculty of Science, Department of Computer Science and Helsinki Institute for Information Technology, Report A-2006-2, Apr. 2006.
"Adaptive Agent-Based Service Composition for Wireless Terminals," Sasu Tarkoma, Mikko Laukkanen:. CIA 2003, pp. 16-29.
"RFC 3261—SIP: Session Initiation Protocol," J. Rosenberg, H. Schulzrinne, G. Carmarillo, A. Johnston, J. Peterson, R. Sparks, M. Handley, E. Schooler, RFC 3261, Jul. 2002.
"Achieving Service Portability using Self-adaptive Data Paths," Z. Morley Mao, Randy H. Katz, IEEE Communications Magazine special Issue on Service Portability and Virtual Home Environment, Jan. 2002.
"Advanced Handover Management in Ambient Networks," Tiziana Toniatti, Francesco Meago, Alberto Periccioli, Shintaro Uno, Eranga Perera and Roksana Boreli, International Workshop on Convergent Technologies (IWCT), 2005.
"ICEBERG: An Internet-core Network Architecture for Integrated Communications," Helen J. Wang, Bhaskaran Raman, Chen-nee Chuah, Rahul Biswas, Ramakrishna Gummadi, Barbara Hohlt, Xia Hong, Emre Kiciman, Zhuoqing Mao, Jimmy S. Shih, Lakshminarayanan Subramanian, Ben Y. Zhao, Anthony D. Joseph, and Randy H. Katz, IEEE Personal Communications, Aug. 2000, pp. 10-19.

* cited by examiner

*Primary Examiner* — Andy Ho
(74) *Attorney, Agent, or Firm* — Banner & Witcoff, Ltd.

(57) ABSTRACT

A system and method for exchanging components between platforms is described. As a user terminal changes location or preferences, the user terminal may be provided with a new platform that supports desired services. A method and system that relates to migrating one or more components that provide composite services from one communication platform to another is described. A user terminal may receive one or more composite services provided by two or more components existing on platform. As the user terminal switches from one platform to another, the platforms attempt to provide the same services to the user with little to no interruption. Various aspects relate to shifting one or more components from the first platform to the second platform to provide local support for the services desired by the user terminal.

29 Claims, 24 Drawing Sheets

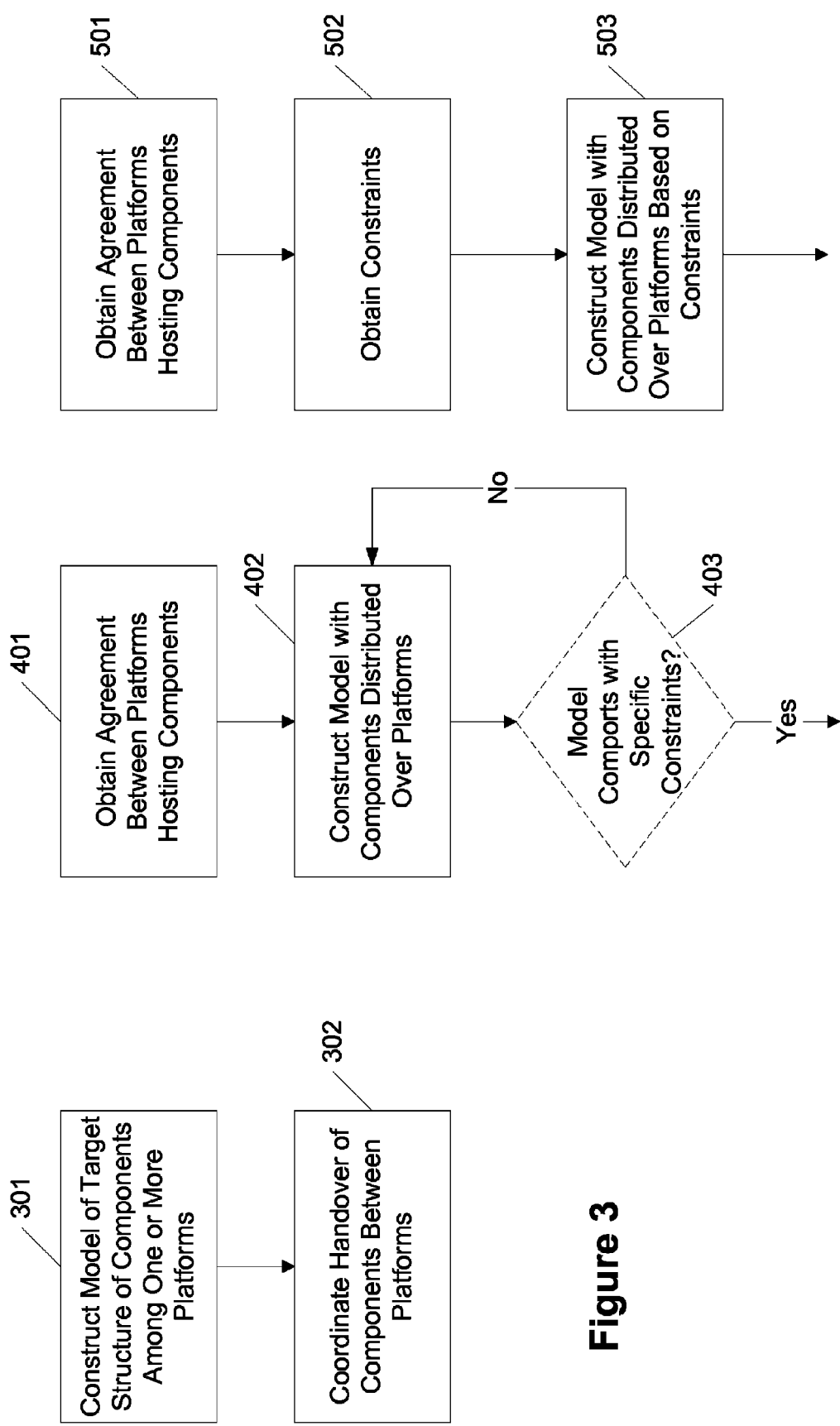

SERVICE MOBILITY FOR COMPOSED COMPONENTS

BACKGROUND

1. Technical Field

Aspects of the present invention relate to exchanging components among platforms where the components provide services to user terminals.

2. Related Art

Users desire different types of services; from sending and receiving emails to downloading and watching movies, network operators provide these services to users through different combinations of components. Each component may provide a service or a part of a service to the end user. Network operators may deploy the various components to provide a user's terminal with the desired service or combination of services. The components are commonly deployed on platforms accessible by the user terminals.

Issues exist where users desire to change their services and/or where users physically move between platforms. Not all network operators use the same component platform. Rather, different platforms exist based on at least one of location, services provided, quality of service guarantees, and the like. In that network operators provide different sets of components, users often encounter interruptions in their services between the teardown of old components from their old platform and reconstruction of the services using components in their new platform.

Part of the issue relates to load balancing. However, the issue can be complex as the change from one service platform to another may involve reconfiguration of the components, for example, by taking into account local conditions or locally available content. Additional parts of the issue range from traditional scheduling and resource allocation problems to components that may be in different states, may be transferred from one platform to another, may or may not be activated, subject to local conditions, subject to personalization, and may currently have active communication sessions with user terminals.

SUMMARY

Aspects of the present invention relate to migrating one or more components that provide composite services to users from one communication platform to another. A user terminal may receive one or more composite services provided by two or more components existing on platform. As the user terminal switches from one platform to another, the platforms attempt to provide the same services to the user without interruption. Aspects of the invention relate to shifting one or more components from the first platform to the second platform to provide local support for the services desired by the user terminal.

This summary is provided to introduce a selection of concepts in a simplified form that are further described below in the Detailed Description. This summary is not intended to identify key features or essential features of the claimed subject matter.

BRIEF DESCRIPTION OF DRAWINGS

FIG. 3 shows a process for handing off services between platforms in accordance with aspects of the present invention.

FIG. 4 shows a process for determining how components should be distributed among platforms in accordance with aspects of the present invention.

FIG. 5 shows another process for determining how components should be distributed among platforms in accordance with aspects of the present invention.

Figure 1:
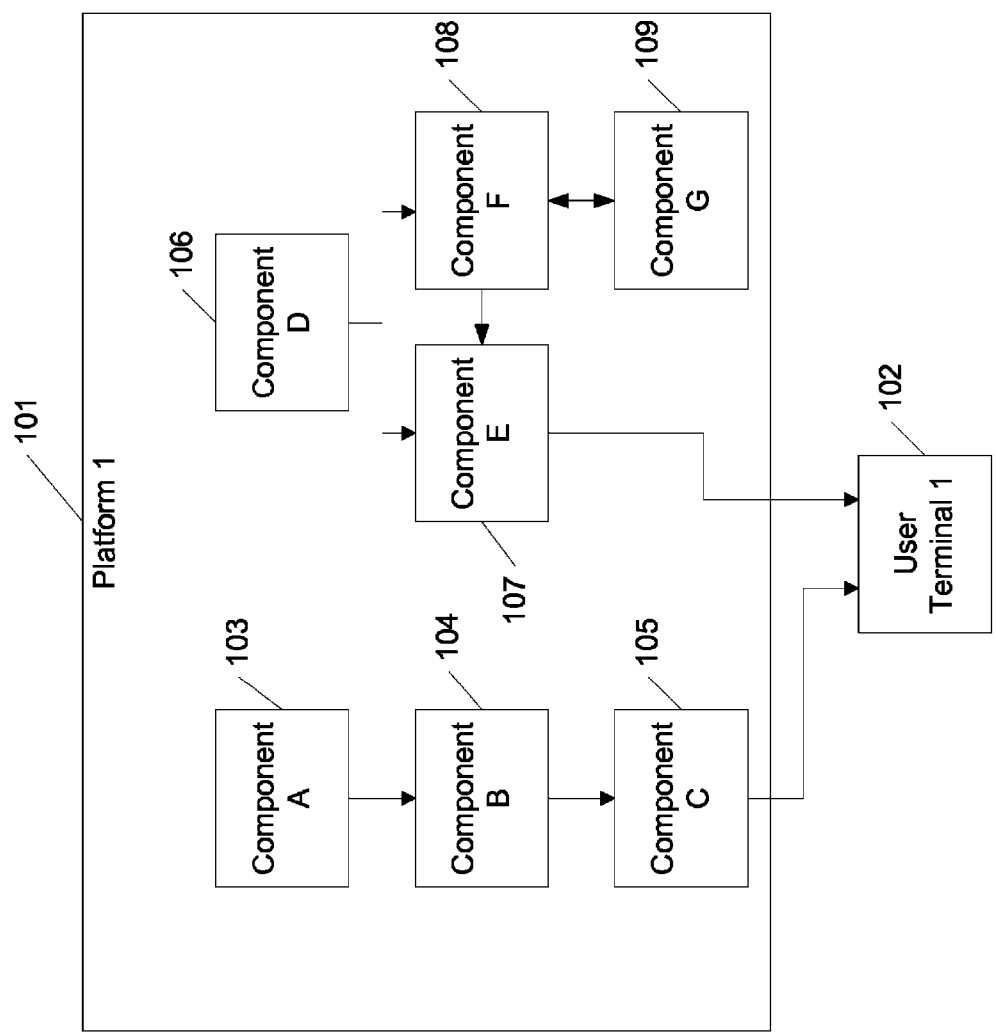
FIG. 1 shows a platform with components providing services to a user terminal in accordance with aspects of the present invention.

These and other aspects of the invention are described below.

DETAILED DESCRIPTION

Aspects of the invention relate to changing components used by platforms to provide services to user terminals. Various services may be provided by one or more components located on one or more platforms. Users may move between platforms for various reasons including change of location, change of desired services, component shortcomings, and the like. One or more aspects of the present invention provide an ability to provide desired services to a user terminal while the user moves between platforms.

It is noted that various connections are set forth between elements in the following description. It is noted that these connections in general and, unless specified otherwise, may be direct or indirect and that this specification is not intended to be limiting in this respect.

One or more aspects of the present invention may be embodied in the form of computer instructions on a computer-readable medium that perform functions as described herein. For example, the computer-readable medium may include a solid state or dynamic memory as known in the art. In other aspects, the computer instructions may be embodied in a carrier wave and transmitted between a sending and receiving system.

Aspects of the system may further be controlled by a centralized server that coordinates the establishment and teardown of the components on the various platforms. Alternatively, the centralized server may be replaced by a number of servers that coordinate the establishment and teardown of the components for each platform individually. Further, with a number of servers working together, the servers may coordinate their timings and placement of services to handle the transfer of services from one platform to another. Each server may have an input that receives information from other servers and components on its platform regarding user terminals. The servers may also have access to one or more databases that store information regarding current operating parameters and information regarding how services are to be shared with other platforms. These and other aspects of the invention are described below.

The following headings generally describe the arrangement of the following description to assist in the understanding of the various aspects and examples of the invention.

I. Component Migration
  A. Overviews of Component Migration
  B. Procedures for Component Migration
II. Determination of Which Components to Migrate
  A. Overview of Determination of Which Components to Migrate
  B. Procedures for Determining Which Components to Migrate
III. State Locking
  A. Overview of State Locking
  B. Procedures for State Locking I. Component Migration
A. Overviews of Component Migration Component migration relates to moving one or more components among platforms as a user's terminal moves between the platforms. The services maybe provided by a single component or a plurality of components located on one or more platforms. Aspects of the present invention relate to organizing the handover of components while continuing to provide uninterrupted service to a user's terminal. Some aspects of the invention relate to reallocating the components at the same time to minimize disruption of the service to the user's terminal.

For purposes herein, a user terminal may include a cellular communications device including a transceiver and processor as known in the art. Further, the user terminal may include other communication devices as well as including computers, laptops, personal digital assistants, watches, communication systems installed in vehicles, and the like. Each of these other communication devices may also include transceivers and processors that receive services from various platforms.

The services described herein relate to services provided by components residing on a service platform. The service platform may be considered as middleware infrastructure based on one or more servers in the network. For instance, the middleware infrastructure may be implemented using an application server and web service technologies that communicate using web service protocols. These technologies allow the formation of composite services provided by complex combinations of components. The composite services may run on different service platforms.

A user may sign into one service platform and receive services from this platform. Often, the service platforms may relate to network service providers. In various situations, the user's home platform may be configured to provide fast service for the user's desired services based on the components in the user's local platform.

Typically, a user would sign in for one service platform and then get services of this platform. The platforms are often tied to network service providers. In particular, the user is typically associated with a service platform in local connection to the current network which provides fast and local access to the services.

FIG. 1 shows platform 1 101 with a number of components that provide services to user terminal 1 102. Component A 103 receives content and forwards information to component B 104. Component B 104 then provides content or services to component C 105, which then provides services to user terminal 1 102. Components A-C 103-105 show a chain of components. FIG. 1 also shows another service being provided to user terminal 1 102 via components D-G 106-109. Component D 106 receives content and forwards the content to both components E 107 and F 108. Component F 108 exchanges information with component G 109 with the result being forwarded from component F 108 to component E 107, then to user terminal 1 102. Components D-G 106-109 may be described as forming a directed acyclic graph (DAG).

The arrangement and use of the components to provide a service to a user terminal may be made increasingly complex if the user joins a new platform. The user terminal may join the new platform based on a change in location or preferences. Despite changing platforms, users desire to maintain their service from their previous or home platform when, for example, traveling in a foreign country.

Figure 2:
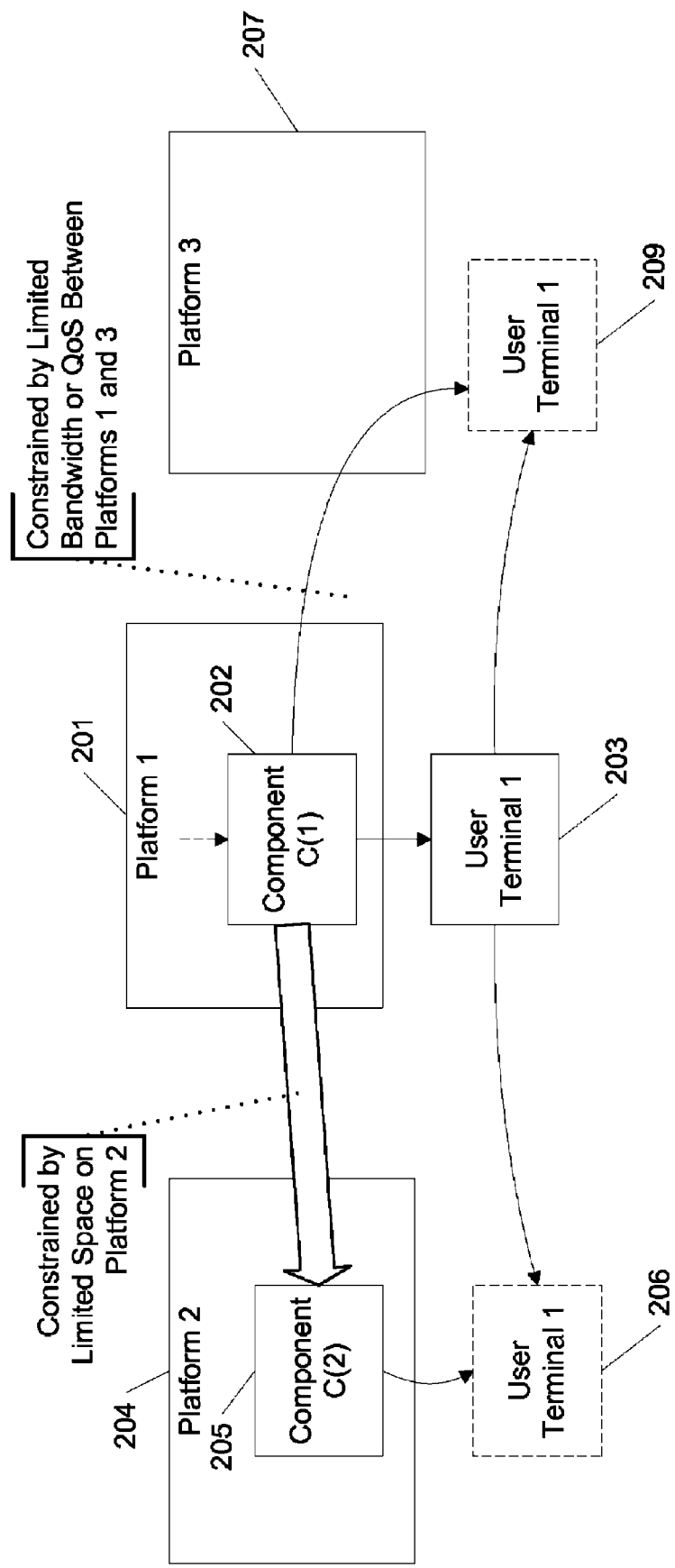
FIG. 2 shows platforms with components providing services to a user terminal where the user terminal moves between the platforms in accordance with aspects of the present invention.

FIG. 2 shows platform 1 201, platform 2 204, platform 3 207, and user terminal 1 203 moving between the platforms 201, 204, 207. When being serviced by component C(1) 202 on platform 1 201, user terminal 1 is shown at position 203. When user terminal 1 moves to position 206, user terminal 1 is serviced platform 2 204. Here, another instance of component C is resident on platform 2 204 (namely, component C(2) 205). Accordingly, user terminal 1 is provided its original service but through the new instance of component C(2) 205 on platform 2 204. In another situation, user terminal 1 moves to location 209 serviced by platform 3 207. Here, platform 3 207 does not include another instance of component C so, to provide the expected services, platform 3 207 receives the services from component C(1) 202 from platform 1 201. In the two situations where user terminal 1 moves to positions 206 and 209, the platforms 204 and 207 may face issues when trying to provide services to user terminal 1. For example, platform 2 204 may be limited by available space to support component C(2) 205 as another instance of component C(2) is being used to provides the services to user terminal 1 at position 206. In contrast, platform 3 207 may be constrained by limited bandwidth or quality of service (QoS) between platforms 1 201 and 3 207.

Aspects of the invention attempt to address where one or more components are to be located among the platforms based on cost values associated with the different configurations of components. For instance, one problem is how to locate the service components in order to provide the desired service for the user terminal, while minimizing a cost to the platforms. The concept of cost among the platforms relates to maximization of available bandwidth on available terminals while keeping some components off of platforms where bandwidth is limited. Also, having more components on a single platform is more desirable than having components spread across multiple platforms. For example, if the service components are spread over several, distant service platforms, the communication overhead increases costs and reduces reaction time to new events in the system. The increase in cost and reduced reaction time is not desired. In addition to these criteria, it may also be that some components can only be executed at specific service platforms, for instance, due to the capabilities or security constraints or due to bandwidth or resource overload at some platforms. These create the need to relocate some or all of service components to a new, local platform for the user terminal. This relocation, however, can create service disruptions to the user and also a relocation costs to the service platform owners. The following description relates to providing quality service to user terminals while minimizing relocation costs to service platform owners.

Composite services can be viewed as a chain of services or a directed acyclic graph (DAG). For instance, a composite service may include an e-mail service that includes a spam filter and translation service. In this example, e-mails are first sent to a spam filter where spam e-mails are removed. Next, e-mails that are passed by the spam filter are forwarded to a basic e-mail service where the basic e-mail service determines whether or not a translation is needed. If a translation is needed for a received e-mail, the e-mail is then forwarded to a translation component where the content of the e-mail is translated from a source language to a target language. Finally the translated e-mail may be forwarded to the user terminal, directly or back to the basic e-mail service component for forwarding to the user terminal. In this example, the enhanced e-mail service is provided by three components.

As a user moves from one platform to another, the user desires to maintain an established service. In this example, the platforms need to agree on a target configuration between both platforms and then organize the service component hand over of the chain or DAG to the target configuration, which may include both service platforms.

B. Procedures for Component Migration

The following relates to one or more procedures for component migration between platforms. Aspects of the present invention relate to an organized handover of one or more components in the chain or DAG that provide composite services for user terminals.

In general, one or more procedures for component migration relate to the organized handover of one or more components while minimizing disruption and maintaining services as being provided to a user terminal. In other words, the operational state of the components can be maintained during the modification of the chain or DAG.

FIG. 3 shows a procedure for providing an organized handover of components between platforms. First, in step 301, the system constructs a model of a target structure of components as being located among one or more platforms. Next, in step 302, the system coordinates the handover of components between platforms. This procedure may be implemented on each platform or by an entity independent of the platforms. In one example, by having an independent entity determine the desired locations of the components, the various decision-making processes may be more equal among platforms.

FIG. 4 shows a procedure for constructing the model of the target structure of components of step 301 of FIG. 3. In FIG. 4, the system obtains in step 401 agreement between platforms hosting components on the desired chain/DAG structure of components. Next, in step 402 this system constructs the model chain/DAG with components distributed over the platforms. At this point, the process of FIG. 4 may be complete. Alternatively, step 403 may be added in which the system determines if a suggested model comports with specific constraints of the components. If the model comports with the specific constraints of the components, from step 403, the procedure of FIG. 4 proceeds to step 302 of FIG. 3. If not, the system constructs a new model in step 402, which is then tested again in step 403.

FIG. 5 shows an alternative approach to constructing a model of a target structure of components among the platforms as shown in step 301 of FIG. 3. First, in step 501, the system obtains an agreement between the platforms hosting the components of a model of the new chain or DAG. In step 502, the system obtains constraints relating to constraints of specific components. Next, in step 503 the system constructs a model with components distributed over platforms based on constraints from the specific components.

Figure 6:
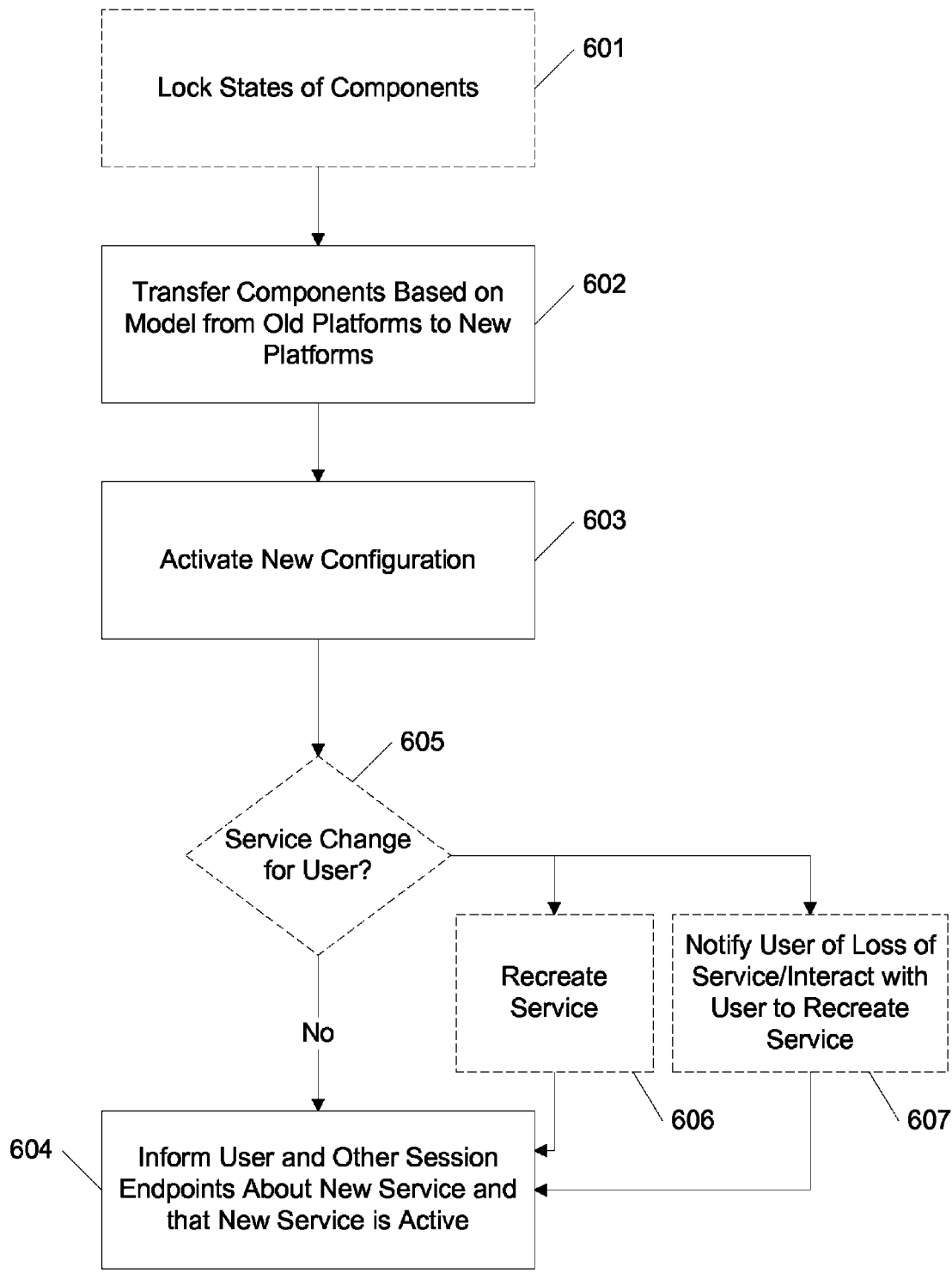
FIG. 6 shows a process that transfers components between platforms in accordance with aspects of the present invention.

FIG. 6 shows a procedure relating to step 302 of FIG. 3. FIG. 6 starts with step 601 in which the system locks the states of components being used to provide services to a user terminal. Is appreciated that step 601 is optional as shown in broken lines in that step 601 may be replaced with synchronization of components as compared to locking per se.

Next, in step 602, the system transfers components based on the determined model from old platforms to new platforms. In step 603, the system activates the new configuration of components. Finally, in step 604, the system informs the user and other session endpoints about the new service and that the new service is active.

In a first example of the procedure of FIG. 6, the process ends with step 604. Alternatively, the process may include step 605 after step 603 in which the system determines whether or not a service change has occurred for the user. If no change has occurred, then the process proceeds to step 604 as described above. However, if a change has occurred, then the system may re-create the service in step 606 or notify the user of the loss of the service and possibly interact with the user to re-create the lost service in step 607.

With respect to step 601 above, the locking of components means that no changes to the service components are possible during the transfer phase of the components from one platform to another. With respect to step 602 above, the transferring of the components can be such described as a chain/DAG that describes the part to be established as the new service platform and the former components further. The transfer of configuration of components may include links to other components which do not transfer (as compared to detailed information regarding each component).

Figure 7:
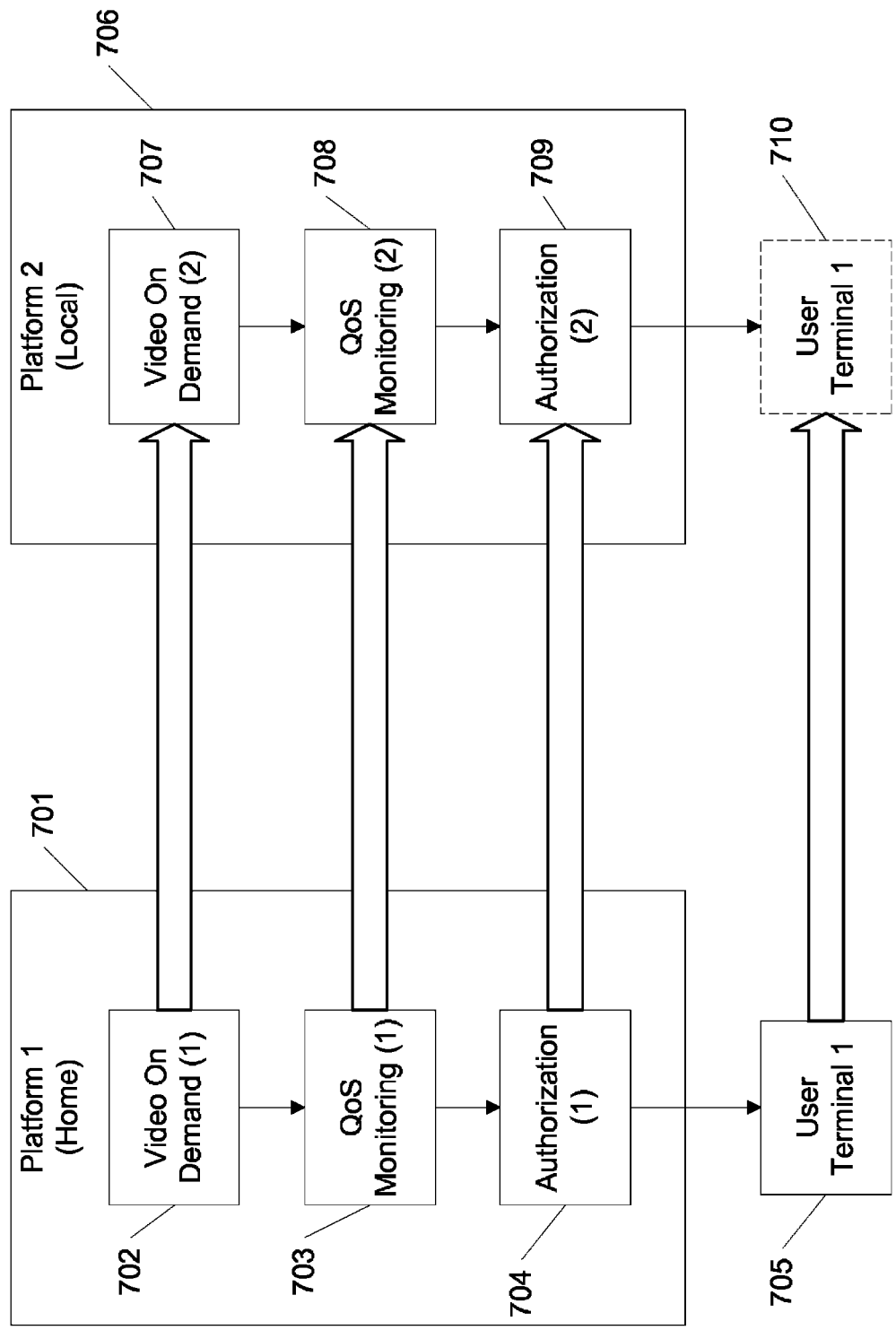
FIGS. 7 and 8 show examples of services being provided to user terminals in accordance with the process of FIG. 6 in accordance with aspects of the present invention.

FIG. 7 shows an example of the transfer of components from one platform to another platform. FIG. 7 illustrates a system in which platform 1 (Home) 701 is the home platform for user terminal 1. When user terminal 1 is being serviced by platform 1 (Home) 701, the user terminal 1 is shown as being located in position 705.

Platform 1 (Home) 701 includes three components: video-on-demand (1) component 702, quality of service (QoS) monitoring (1) component 703, and authorization (1) component 704. Also shown in FIG. 7 is platform 2 (Local) 706, which is local to user terminal 1 when user terminal 1 is at position 710. Platform 2 (Local) 706 includes three components: video-on-demand (2) component 707, quality of service (QoS) monitoring (2) component 708, and authorization (2) component 709.

FIG. 7 shows a typical case in which a user terminal 1 moves from platform 1 701 to platform 2 706 by roaming from one network to another. In this example, user terminal 1 is using a video on demand service in which a video on demand (VoD) server component feeds a video signal to a quality of service (QoS) monitoring component that then forwards the video signal through an authorization service component to the user terminal 1.

When moving to a new platform, the service components have to be adapted for the new configuration; otherwise, the service is not accounting for variations that may reduce the burden on the various platforms. For instance, the quality of service (QoS) monitoring should be done as close to the user terminal 1 as possible and may even be network specific to monitor an actual data rate delivered to the user terminal 1. In this example, the video is available from a local component 707 of platform 2 706. Finally, authorization may also be done locally (possibly with interaction with authorization component 704) as authorization component 709 is also on platform 2 706.

When moving the new platform, the user's service components have to be adapted—otherwise the service is not working in an optimal way. For instance, the QoS monitoring should be done as close to the customer as possible, and can even be network specific to check the actual data rate delivered to the user. Second, in this example, the video is available in the other local component of platform 2, which is more cost effective to use. Also, authorization can be done locally (maybe with help from the home platform).

With respect to FIG. 3, step 301, a target configuration is determined by the criteria of the location of the various components available in platform 2 706. The platforms may exchange the following information relating to the construction of the new model: the original configuration of components, an indication of which components may be moved to platform 2 706, and essential service component information (for instance, which video is selected, a location in the playback of video, and the like).

Based on this information, the platforms determine a target configuration which may be better than the original configuration for servicing user terminal 1 at location 710. Feasibility of the target configuration should be checked, e.g. availability of the video. A simple way to do this is that service platform 1 701 checks the local constraints which are known at platform 1 701, and then proposes a structure of services based on this information. In this example, platform 1 701 may propose to transfer the full chain to platform 2, which is then accepted by platform 2.

With respect to FIG. 3, step 302, the components may be locked and server state may be fixed such that the service state cannot be changed. For instance, the video may continue to be played back to a user, but the session cannot be stopped despite the short transfer time. Alternatively, the session may be interrupted temporarily while the new service is established. Next, the state is transferred to platform 2 706, which then creates or starts appropriate service components and configures them.

Next, referring to FIG. 6, in step 603, the components are then activated. For instance, the components may be activated in a synchronized way. For instance, the authorization and QoS monitoring components may be activated first. In parallel, the user terminal may be informed about the new service contact and be sent a message when the activation has been completed. Next, the user may then switch over by releasing connections with the old service components (for instance shown in FIG. 6, step 604).

Figure 8:
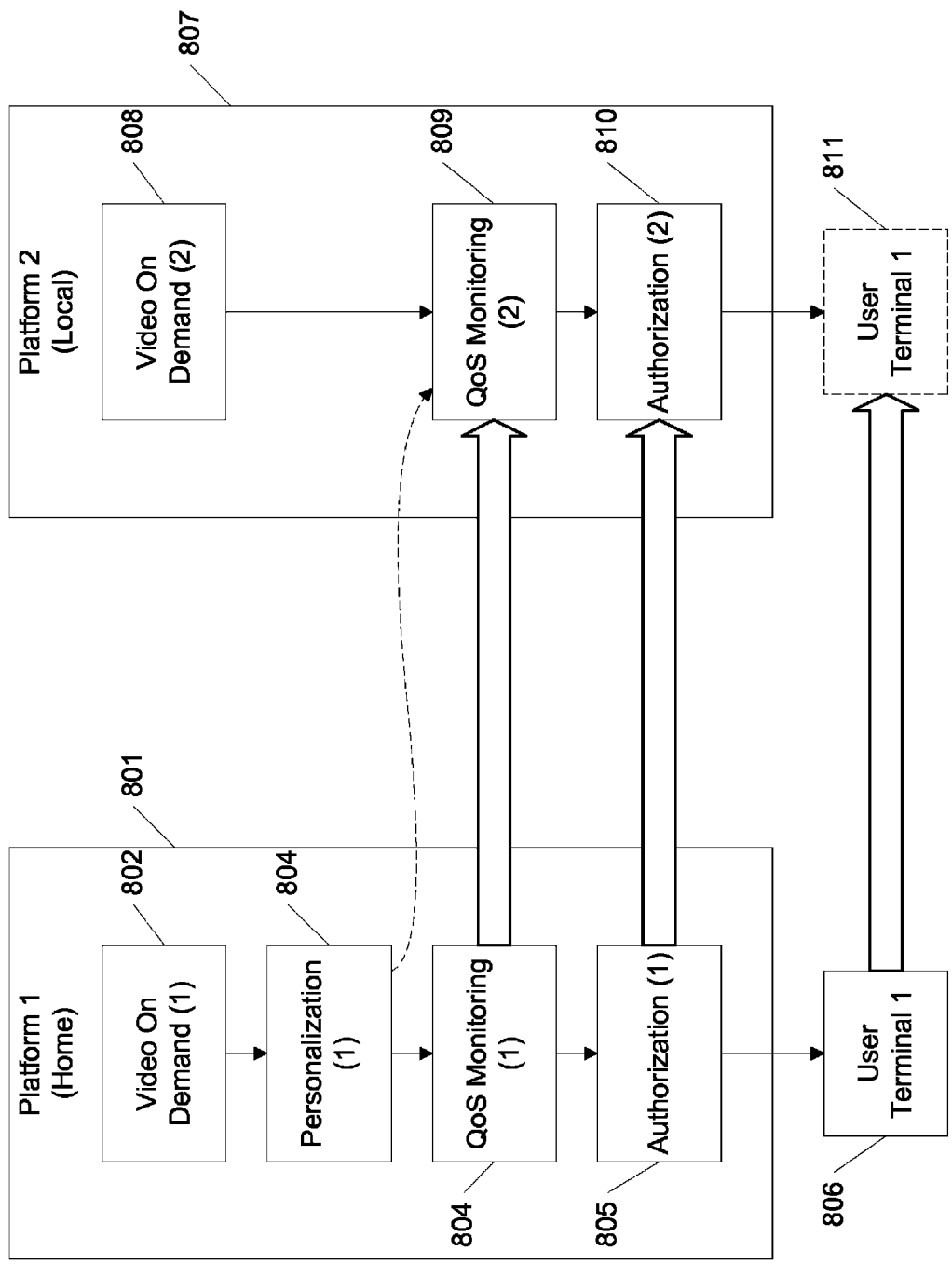

FIG. 8 shows another example of the transfer of components from one platform to another platform with components similar to those of FIG. 7. FIG. 8 illustrates a system in which platform 1 (Home) 801 is the home platform for user terminal 1. When user terminal 1 is being serviced by platform 1 (Home) 801, the user terminal 1 is shown as being located in position 806.

Platform 1 (Home) 801 includes for components: video-on-demand (1) component 802, personalization (1) component 804, quality of service (QoS) monitoring (1) component 804, and authorization (1) component 805. Also shown in FIG. 8 is platform 2 (Local) 807 which is local to user terminal 1 when user terminal 1 is at position 811. Platform 2 (Local) 807 includes three components: video-on-demand (2) component 808, quality of service (QoS) monitoring (2) component 809, and authorization (2) component 810.

In particular, FIG. 8 shows an extended case in which a personalization component 804 is used to provide information to personalize the service is being provided to user terminal 1 while at location 806. Here, platform 1 801 initially proposes to move all components to platform 2 807 except the personalization component 804. Next, platform 2 807 realizes that the video component 802 is not available on platform 807 and informs platform 1 801 that the video component 802 cannot be transferred. Platform 1 801 then creates a new proposal to transfer only the QoS monitoring 804 and authorization 805 components. The remainder of this example proceeds similar to the above example as shown with respect to FIG. 7.

The following provides some of the benefits that may be achieved with respect to the approach shown its respect to FIG. 3. First, for instance, transfer may be coordinated to be performed in a single batch operation. This batch operation processing reduces transfer costs and effort for handling registrations including security protocols and credentials. Next, one of the benefits of maintaining state among locked components is that resumption of the service by the new platform guarantees the synchronization between the states of the old platform and the states of the new platform. Moreover, it is possible to use components from both platforms in a flexible way so as to maximize the utility of the locations of the various components with respect to the changing position of the user terminal 1.

II. Determination of Which Components to Migrate

A. Overview of Determination of Which Components to Migrate

The above section related to the mobility of components among platforms. The following section relates to a handover decision procedure for services having components among multiple platforms. The handover decision procedure attempts to determine a model for locating components among multiple platforms so as to minimize costs associated with the service being provided to the user terminal.

In this section, the locations of the service components and the identities of the source and target service platforms are known. This section describes how the costs may be determined with respect to given constraints. In at least one example of the invention, some components that are part of a current service may be reallocated or activated in order to improve user experience.

If the service components are spread over several, distant service platforms, the communication overhead increases cost for the entire system and reduces reaction time, neither of which is desirable. In addition to these criteria, it may also be that some components can only be executed on specific service platforms (for instance, due to platform capabilities or security constraints or due to overload at some platforms). This creates the need to relocate some or all of the service components to the new, local platform. This relocation, however, can create service disruptions felt by the user and also a relocation cost to the service platform owners.

There is a need to deliver multimedia content to the consumers in the form of data streams. The data sources can be distributed on the Internet and a replica manager component may be needed to track data sources and data copies. Caching can be used to optimize streaming over wide-area networks. A monitor component can be used to monitor the users' status and also the status of the current set of data sources. If the QoS of a user or a significant data source changes, reconfiguration is needed to improve end-user experience. In addition, a data transformation component is needed to adapt the data for the consumer's terminal. Finally, a delivery manager can be responsible for the data delivery to the consumer's terminal using the appropriate delivery protocol.

A decision procedure may be used that decides which components are used and where, and determines the best component usage strategy for the given constraints. The constraints may include communication constraints, security policies, and costs pertaining to server overhead in both source and target platforms.

Terminal mobility within a single platform can be handled within that platform using local monitoring and controlling. It is expected that basic mobility support is handled by lower layers. For inter-platform mobility, the user terminal is authenticated and authorized in the remote platform. The home platform may be contacted for user credentials and a SLA (Service Level Agreement) is consulted. After this procedure, basic connectivity is established for the terminal in the remote platform.

The composed service handover starts after basic connectivity has been established at the remote platform. Before the handover can start, the user and terminal should be properly authenticated and authorized. In addition, there should be a service level agreement (SLA) in place that allows service roaming between the two platforms. The handover can be coordinated by the handover managers of the two platforms. It may also be the case that the service is initially provided by components in multiple platforms.

The following provides one or more asynchronous events that may trigger the decision procedure as described herein. The composite service handover may begin once at least some of the following conditions are satisfied:

The terminal or user has changed the currently active service platform;

At least one service is based on a number of components (namely, the service is a composite service);

The new platform has an SLA with the old platform and provides components that can be used in the composite service; and A service handover and reconfiguration has not happened for this service and user terminal in the last T seconds.

where T is the handover threshold time. For instance, T may range from 2 to 10 minutes. In one example, T may equal 5 minutes. However, any value of T may be used that is sufficiently large to prevent repeated reestablishment of services and tearing down the old ones created moments ago. The time delay period T is used to prevent oscillations. The time T may be a constant value or a function dependent on other factors (including available bandwidth of target platform, space available on the target platform, etc.) The handover may then be performed if a better configuration is found. Here, configurations are expected to be relatively long term. The value of T may be tuned separately for services that (for some reason) require continuous reconfiguration.

In the streaming content the components can be distributed as follows:

Content sources are distributed and content is cached by the home platform, but there is no special support for the service in the remote platform. All adaptation and transformation are done by the home platform.

Content is cached by both platforms and the remote platform retrieves the personal profile from the home platform. Content is adapted based on personal and terminal profile at the remote platform.

The service is available also in the remote platform and activated when the terminal roams. Only personal preferences and content are retrieved from the home platform.

Of the cases, the first one is the default configuration and places the most load on the home platform and the network. In the second case, content caching reduces inter-platform communication overhead, but still places overhead in the local platform if data conversion is needed. The third option is the preferred choice and places more overhead on the remote platform while reducing inter-platform communication.

As a second more detailed example, the following describes a content filtering Blog monitor as an example. The Blog monitor service may include four components, namely a blog fetcher robot, a spam filter, a personalizable content filter, and a push service for delivering content for end-user terminals. The components have a linear dependency in the order they are presented. The blog fetcher robot monitors a certain set of URLs and retrieves blog content periodically. The spam filter maintains a database of known spam sources and spam pages. The personalizable content filter selects part of new blog entries discovered by the fetcher for end-users. Finally, the push service is responsible for delivering this content using a suitable push abstraction. Both the fetcher engine and the content filter are configured by end-user preferences, namely the fetcher needs to be updated on monitored URLs, and the personalizable content filter must be aware of current user interests. The set of monitored URLs may also be configured by the administrator. This is expected to prevent the monitoring of bogus blogs. In this case, the spam filter may not be needed. Each platform may have its own spam filter.

Now, the components may be used at the source platform or they may be relocated, or activated at the destination platform. The handover decision procedure evaluates the different configurations by computing a cost for each configuration by evaluating both the configuration cost and the run-time continuous usage cost of the configuration. For example, this can be a sum of the two costs with the latter value multiplied by the expected running time of the configuration. If this calculation strategy is employed, the initial cost of the handover is reduced over time, and the smallest cost is the preferred configuration. The cost may be latency, signaling cost in terms of exchanged messages, or some other metric. It may also be a combination of these.

To demonstrate the cost computation, one may consider the following scenario. Assume that any local signaling within a platform takes 1 millisecond per message and any signaling between two platforms takes 10 ms. Accessing platform A from platform B without platform support is expected to cost 20 ms. Then the basic signaling cost of the service pipeline is 4 ms in both platforms. Consider now the case that consumer relocates from the platform A to the platform B. The service access cost is now 24 ms. Then, if the push service is activated, the cost is reduced to 14 ms with the initial cost of at least a round-trip (20 ms). If the service usage at platform B is long term, this strategy should be implemented instead of accessing the service directly from platform B at a higher cost.

In particular, the following describes this example in detail.

Let C0 denote the one-time cost for reconfiguring the service

Let C1 denote the cost of service delivery in a suitable metric, for example latency.

Let C2 denote the cost of accessing the service locally in the old platform.

Let C3 denote the cost of accessing the service locally in the new platform.

Let C4 denote the cost of communication between the platforms on the network-layer.

Let C5 denote the cost of communication with the old platform through the new platform.

The support from the platforms can be used to ensure Quality of Service parameters and the ability to successfully connect to the client across platforms. The cost is formulated as follows:

$$OldCost = C1 + C2 + C4 \quad (1)$$

Given that the whole service is transferred, the new cost is:

$$ExpectedCost1 = C1 + C3 + C4 + C0 \quad (2)$$

Given that no component is transferred, the cost is:

$$ExpectedCost2 = C1 + C3 + C5 + C0 \quad (3)$$

The cost of the new configuration is therefore the difference between ExpectedCost1 and ExpectedCost2. The new costs depend on C3 and C5. C3 is expected to be significantly smaller than C5.

In the example, sample times are as follows: C0=0, C1=3 ms, C2=C3=1 ms, and C4=20 ms, and C5=10 ms. Hence, $$OldCost = 3\ ms + 1\ ms + 20\ ms = 24\ ms \quad (4)$$

$$ExpectedCost1 = 3\ ms + 1\ ms + 20\ ms = 24\ ms \quad (5)$$

$$ExpectedCost2 = 3\ ms + 10\ ms + 1\ ms = 14\ ms \quad (6)$$

$$\text{Cost of the New Configuration} = 10\ ms \quad (7)$$

This simple example considers only latencies of the component pipeline; however, also the amount of signaling needs to be taken into account in the decision process. The metric can be a combination of the latency and the signaling cost between two components as follows: latency between the given source and target components (of the service) multiplied by the amount of traffic in the direction of the target. This cost may then be used in evaluating the different configurations and selecting the one that minimizes the long-term cost.

The handover decision mechanisms described herein can be implemented for IMS service platforms and for, for example, the Nokia Unified Core and ISN product (Intelligent Service Node). Federated IMS platforms have SLAs between them that identify how components can be executed across platforms. A terminal handover manager is executed in each platform that detects when a user roams that is using a composite service (or services). After this the decision mechanism is started according to the description in the previous section. The components can reside on IMS Application Servers, for instance.

At least one benefit of one or more approaches is attempting to determine highly efficient component configurations for the service access experience in terms of the employed metric; reducing transfer costs and efforts for registrations, including security protocols and credentials, and improve content delivery experience; minimizing oscillations between configurations by estimating the duration of service access at the new platform; and using components from different platforms in flexible ways and to use resources of these platforms to address these concerns. These and other aspects are described below.

B. Procedures for Determining Which Components to Migrate

Figure 9:
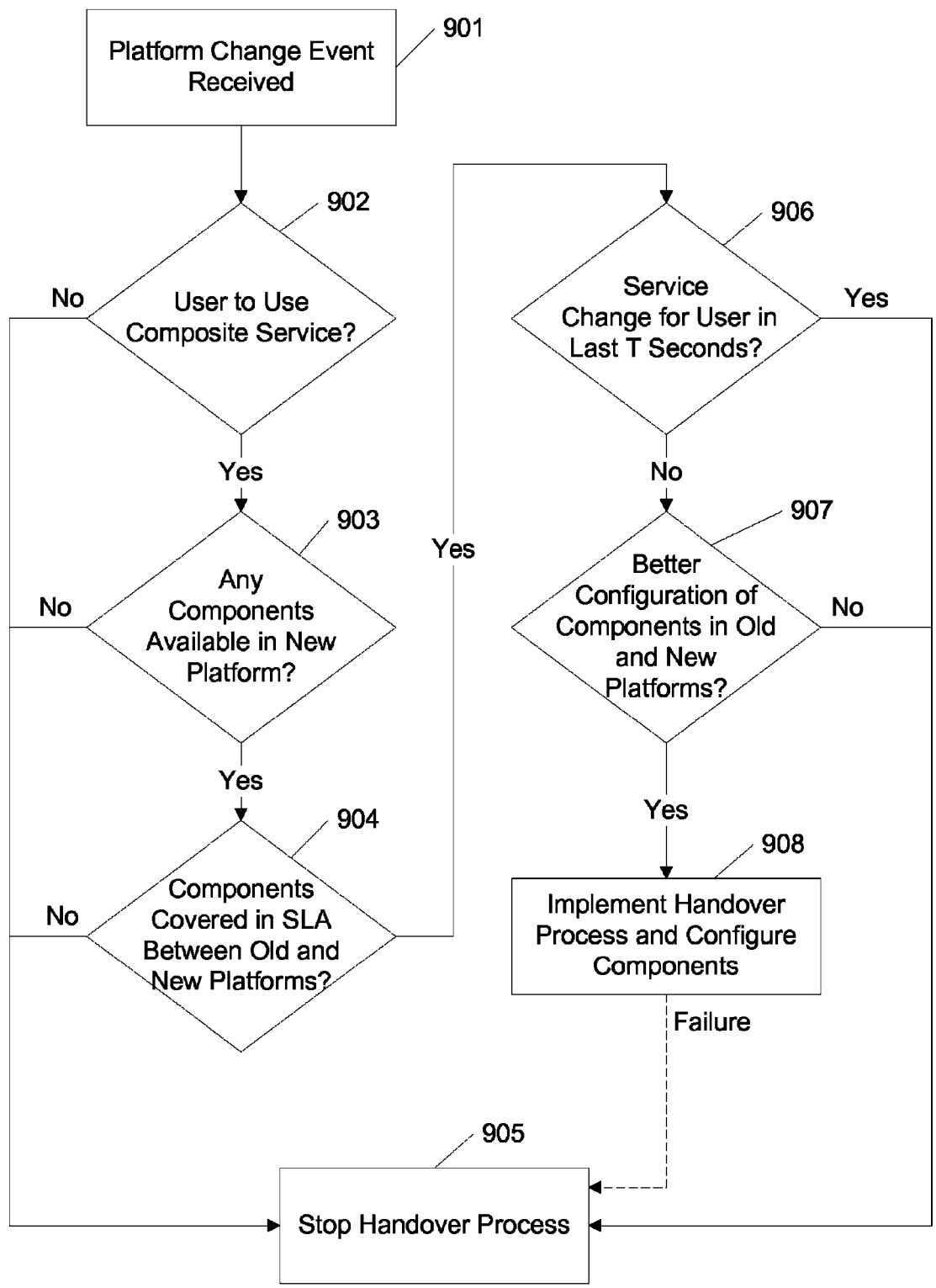
FIG. 9 shows a process for determining which components are to be used and implementing handoff between platforms in accordance with aspects of the present invention.

FIG. 9 shows a decision-making process for starting the composite service handover. In step 901, a platform change event is received. This may be also referred to as an information gathering phase. Here, the system determines active composite services for the user terminal at the home platform.

Next, in step 902 the system determines whether a user is to use a composite service. Here, the system identifies components and component dependencies of each service desired by the user terminal. If no from step 902, then the user is only using a single component service and the handover process stops in step 905. However, if, from step 902, the user is to use a composite service, then the process proceeds to step 903 where the system determines whether any components are available in the new platform. If no components are available in the new platform, then the handover process stops in step 905. However, if components are available in the new platform, from step 903, the process then advances to step 904.

In step 904, the system determines if the components in the new platform are covered in the service level agreement SLA between the old platform and the new platform. To perform this check, the system may also identify a network profile and availability of each component in the new platform. If the components are not covered, then the handover process stops in step 905. However if the components are covered in the SLA from step 904, then, in step 906, the system determines whether or not the service has changed for the user in the last T seconds. In other words, the system determines the current operating context for the user terminal on its current platform. If the service has changed for this user in the last T seconds, then the handover process stops in step 905. Otherwise, if the service has not changed in the last T seconds, then the process proceeds to step 907. If, in step 907, the system determines that there is a better configuration of the components in the old and new platforms used to provide the service to the user terminal, then the process continues to step 908. In step 907, the system determines the feasibility of component activation and execution plans for the various platforms. The determination of step 907 may include determining various costs including setup costs and expected running costs in the target platform. This may also include a determination of the number of currently active component/service users affected by the new plan. Further, each new plan (or model) should be consistent and meet set requirements on network traffic and application server utilization requirements. Further, the system may consult and update history information (a log of changes and component handovers, for instance). Here again the system may compare a current model with previous models. Further, the system may attempt proved to prevent oscillations by estimating the duration of service access in the new service platform. Here, effectively the system determines the best plan. If, from step 907, no better configuration exists, then the handover process stops in step 905.

In step 908, the system implements handover process and configures the components. If a failure occurs at step 908, then the handover process is stopped in step 905.

In order to be able to make meaningful service activation and execution plans, each platform should have models of the components and composed services. The models should be expressed in a language that allows comparison and combination of the models.

The service components can be viewed as forming a chain of services or a DAG (directed acyclic graph). E.g. a spam filter is composed with a translation service and an email service to provide an enhanced email service, where the emails are sent first to the spam filter, then to the basic mail service and then are translated if needed. In this example, three components are used to provide this composite service.

Each combination of components may need to be assessed separately for deployment cost and usage cost. To give an example of service access cost, the system may consider the latency of communication. A high RTT (Round-Trip Time) to home platform motivates activating part of the service locally, for example by caching content.

A number of configurations may not be reasonable and these should be removed as early as possible from consideration. Moreover, a component that has been already deployed and configured may also be considered as this component also affects the cost model. There may also be additional conditions and constraints to the execution plan. Also, the tolerance of the execution plan needs to be evaluated so that the chosen plan is relatively stable to minor changes in the operating context. The implementation of a plan is possibly expensive, which means that the system must avoid oscillation between a number of orthogonal plans.

The following describes the handover decision procedure as shown in FIGS. 10-16. For purposes herein, the following sets are used to determine the various configurations that may be used in conjunction with the new platform.

form. In step 1101, the system determines whether components in the SET_OVERLAP set are covered by the SLA. If no, then the handover process is stopped in step 1102. If components in the SET_OVERLAP set are covered by the SLA, then the process advances to step 1103. In step 1103, the system determines whether all components are covered by the SLA. If no, then the system marks only components that are in the new platform and covered by the SLA as CANDIDATES in step 1107. Next in step 1108, this procedure keeps only CANDIDATES in the SET_OVERLAP set. Next, the procedure advances to step 1105 where the system determines whether the SLA allows reconfiguration of components. If yes from step 1105, then the system identifies each component that can be reconfigured as a member of set SET_RE. If no from step 1105, then the set SET_RE is set to null (no members).

From step 1103, if all components are covered by the SLA, then the system marks all components in the new platform as CANDIDATES in step 1104. The procedure then advances to step 1105 as described above.

Figure 12:
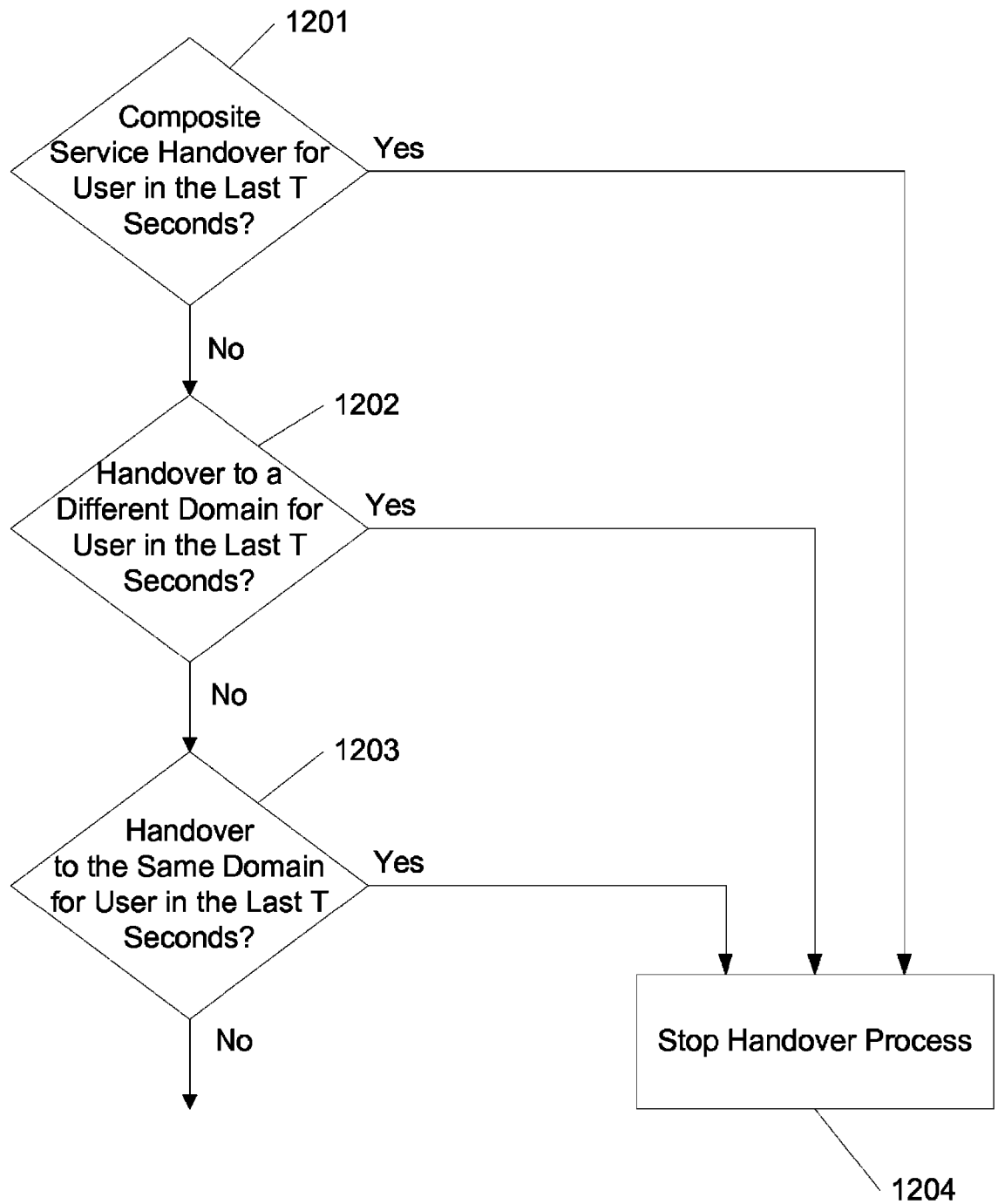
FIG. 12 shows a process for reducing oscillations between handovers in accordance with aspects of the present invention.

FIG. 12 shows an overview of the oscillation prevention procedure. This procedure uses a threshold timer value T that prevents rapid oscillations between service configurations. In step 1201, the system determines if a composite service hand over for the user has occurred in the last T seconds. If yes, then the handover process is stopped in step 1204. If no, then the system determines if a handover has been made to a different platform for the user in the last T seconds. If yes, then the handover process is stopped in step 1204. If no, then the process advances to step 1203. In step 1203, the system determines if a handover to the same platform has occurred

| Parameter | Description |
|---|---|
| T | Handover threshold time. This is used to prevent oscillations. Can be a constant or a function. |
| SET_OLD | A set that contains the components of a composed service in the old configuration. They may span several platforms. |
| SET_OVERLAP | A set that contains the components that are in both the old configuration and the new platform. |
| SET_RE | A set that contains components in the new platform that may be reconfigured and personalized. The specific mechanism of reconfiguration is dependent on the service description and user profiles. |
| SET_ACTIVE | Components that are already active in the new platform. |
| SET_NONACTIVE | Components that are not active and subject to a one-time activation cost. |
| SET_NOTCONFIGURED | Components that are active, but not configured for a particular user. They are subject to a one-time configuration cost. |

Figure 10:
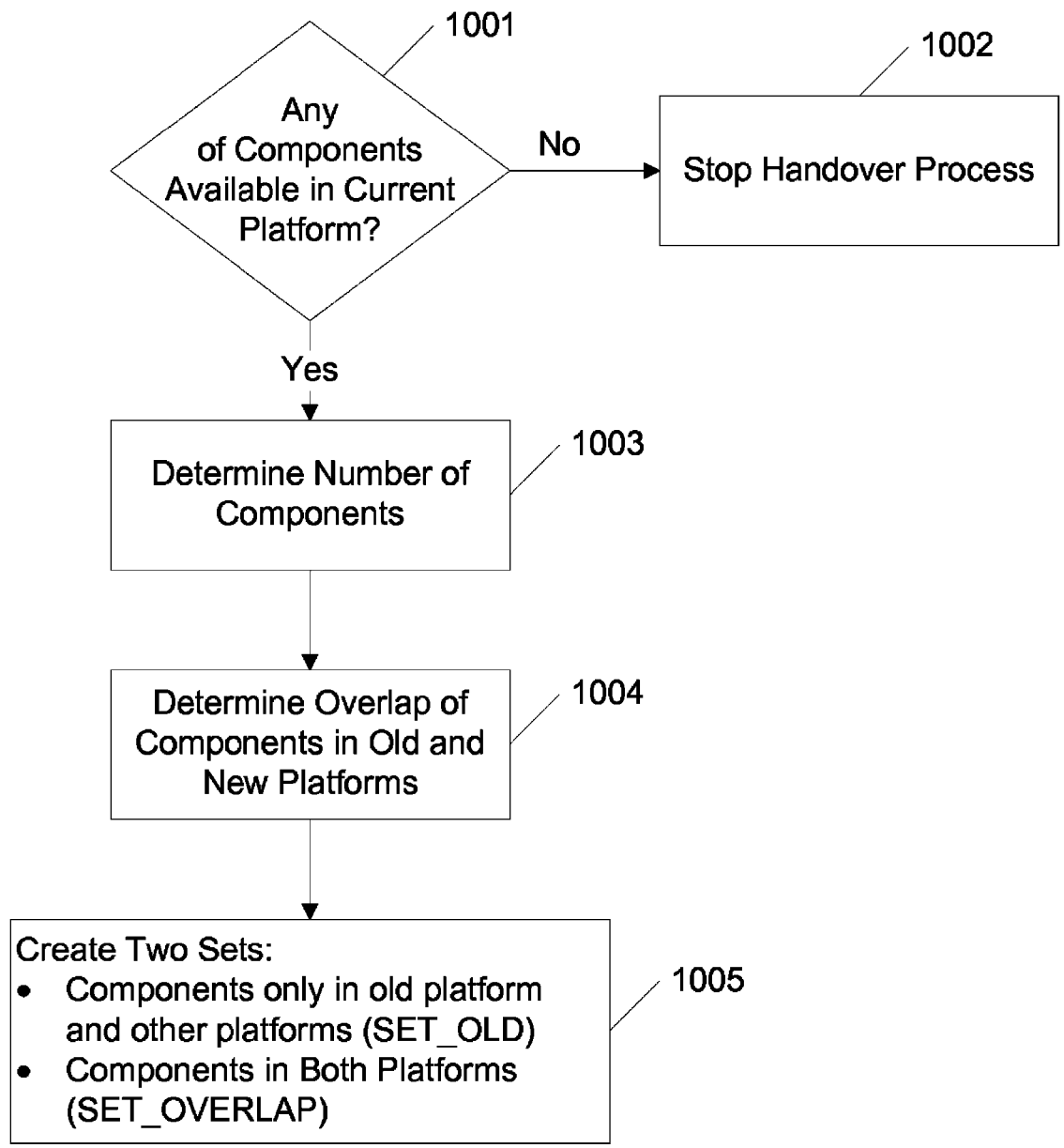
FIG. 10 shows a process for determining sets of components to be used in accordance with aspects of the present invention.

FIG. 10 presents the selection of the components involved in the handover in more detail. In step 1001, the system determines if any components are available in the current platform. If no from step 1001, then the system stops the handover process in step 1002. If, however, any components are available in the new platform, the system then proceeds to step 1003. In step 1003, the system determines a number of available components in the new platform. Next, in step 1004, the system determines overlap of components in the old and new platforms. In step 1005, the system creates two sets: the first set relating to components only in the old platform and other platforms (referred to herein as SET_OLD) and the second set relating to components overlapping in both platforms (referred to herein as SET_OVERLAP).

Figure 11:
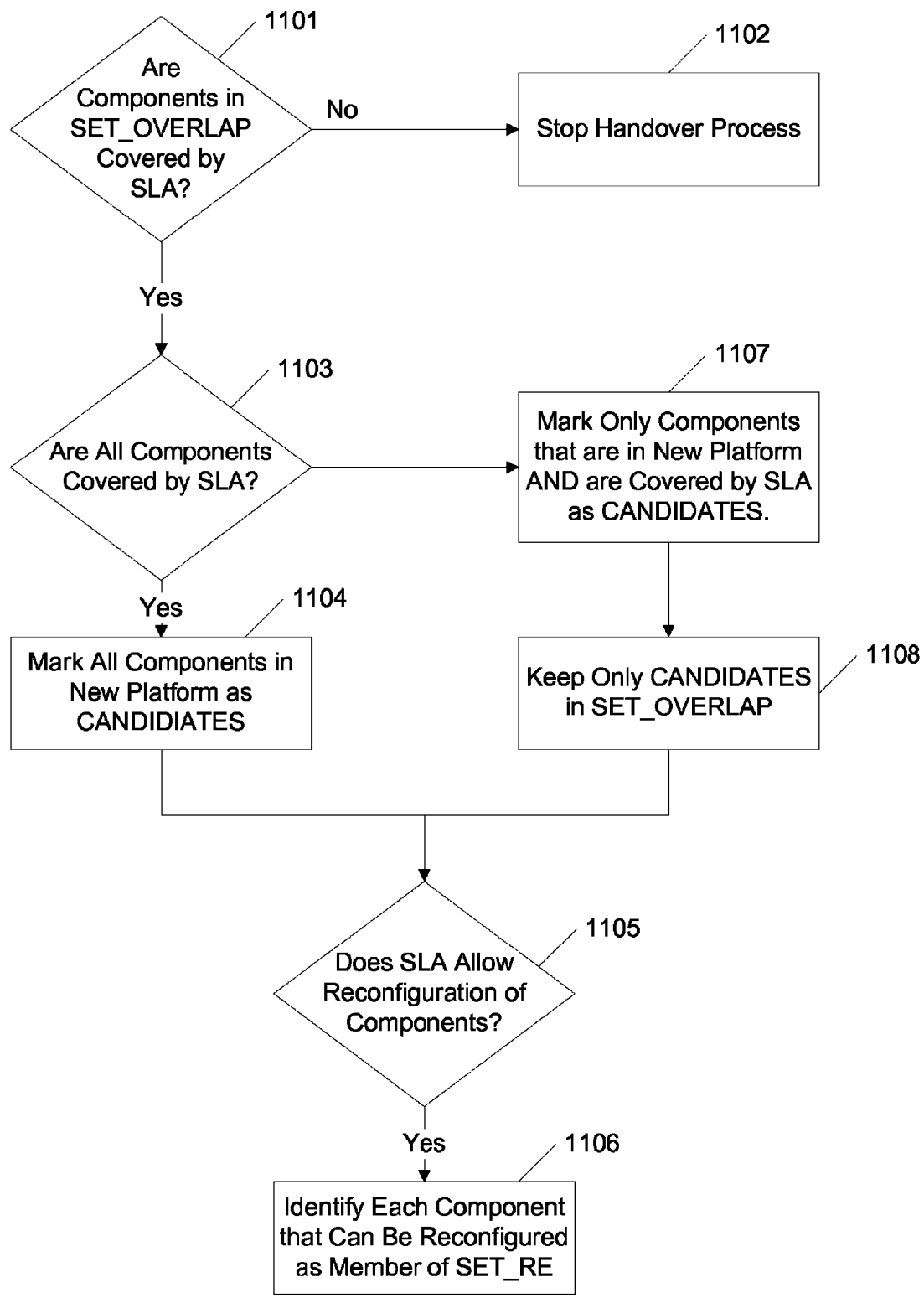
FIG. 11 shows a process for refining the sets of components determined in the process of FIG. 10 in accordance with aspects of the present invention.

FIG. 11 shows how SLAs are taken into account by the procedure. SLAs may also determine whether or not a component can be reconfigured and personalized in the new platfor the user in the last T seconds. If yes, then the handover process is stopped in step 1204. If no, then the procedure continues to FIG. 13.

Figure 13:
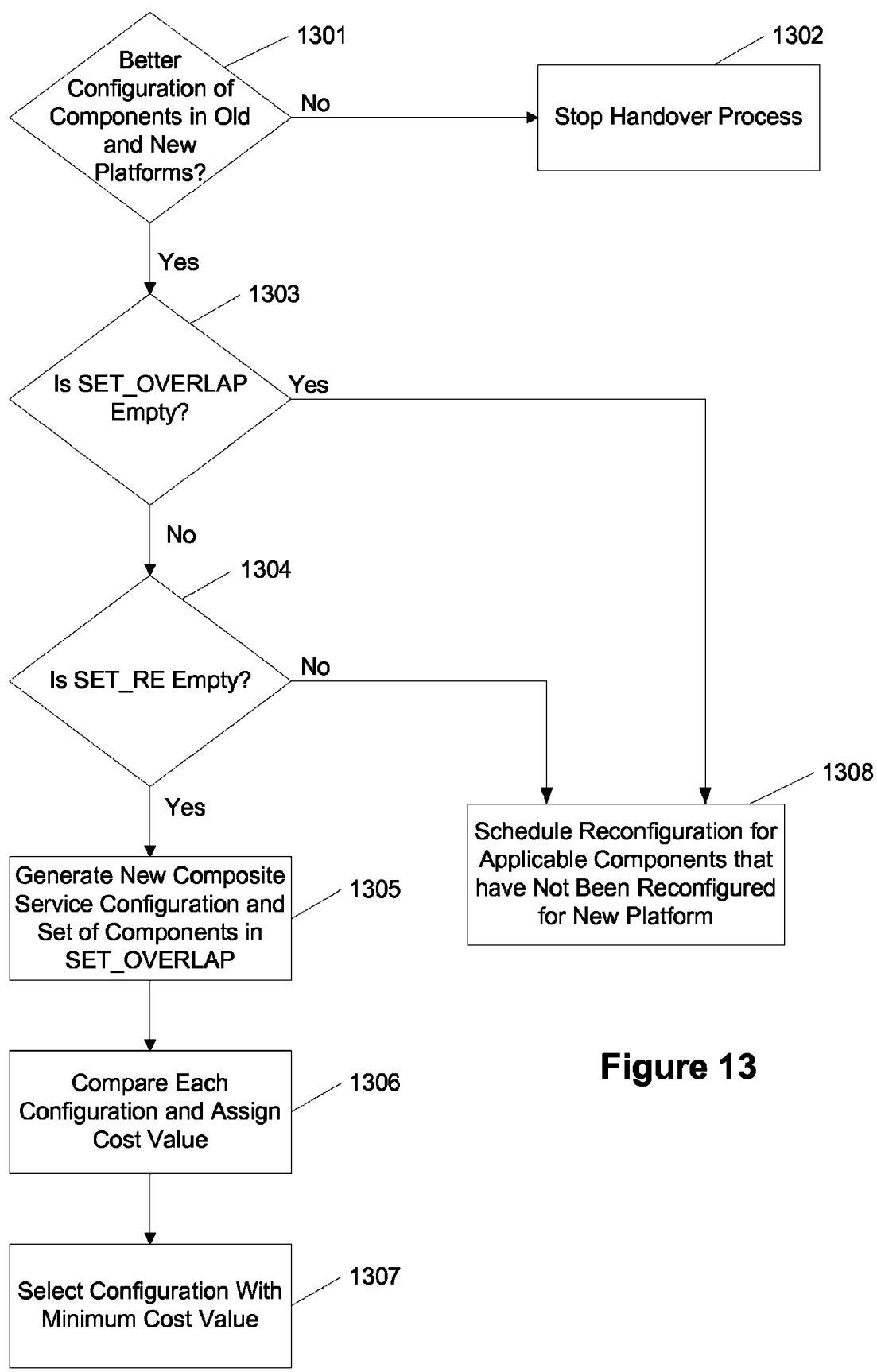
FIG. 13 shows a process for comparing costs of configurations in accordance with aspects of the present invention.

FIG. 13 shows how different composite service configurations are compared by a handover decision procedure. In step 1301, the system determines if a better configuration exists for the components in the new and old platforms. If no, then the process ends in step 1302. If a better configuration exists, then the system advances to step 1303. In step 1303, the system determines if SET_OVERLAP is empty. If yes, then the system consults a service policy and description for each component and schedules reconfiguration for applicable components that have not been reconfigured for the new platform in step 1308. It is noted that this approach may add latency to the handover. However, this latency may be accounted for in the determination of different models.

From step 1303, if the SET_OVERLAP set is not empty, then the system determines if SET_RE is empty in step 1304.

If no, then the system advances to step 1308 as described above. If yes, then the system generates new composite service configuration and the set of components in SET_OVERLAP 1305. Next, in step 1306, the system compares each configuration and assigns a cost value. Next in step 1307, the system determines the configuration with that minimum cost value.

Figure 14:
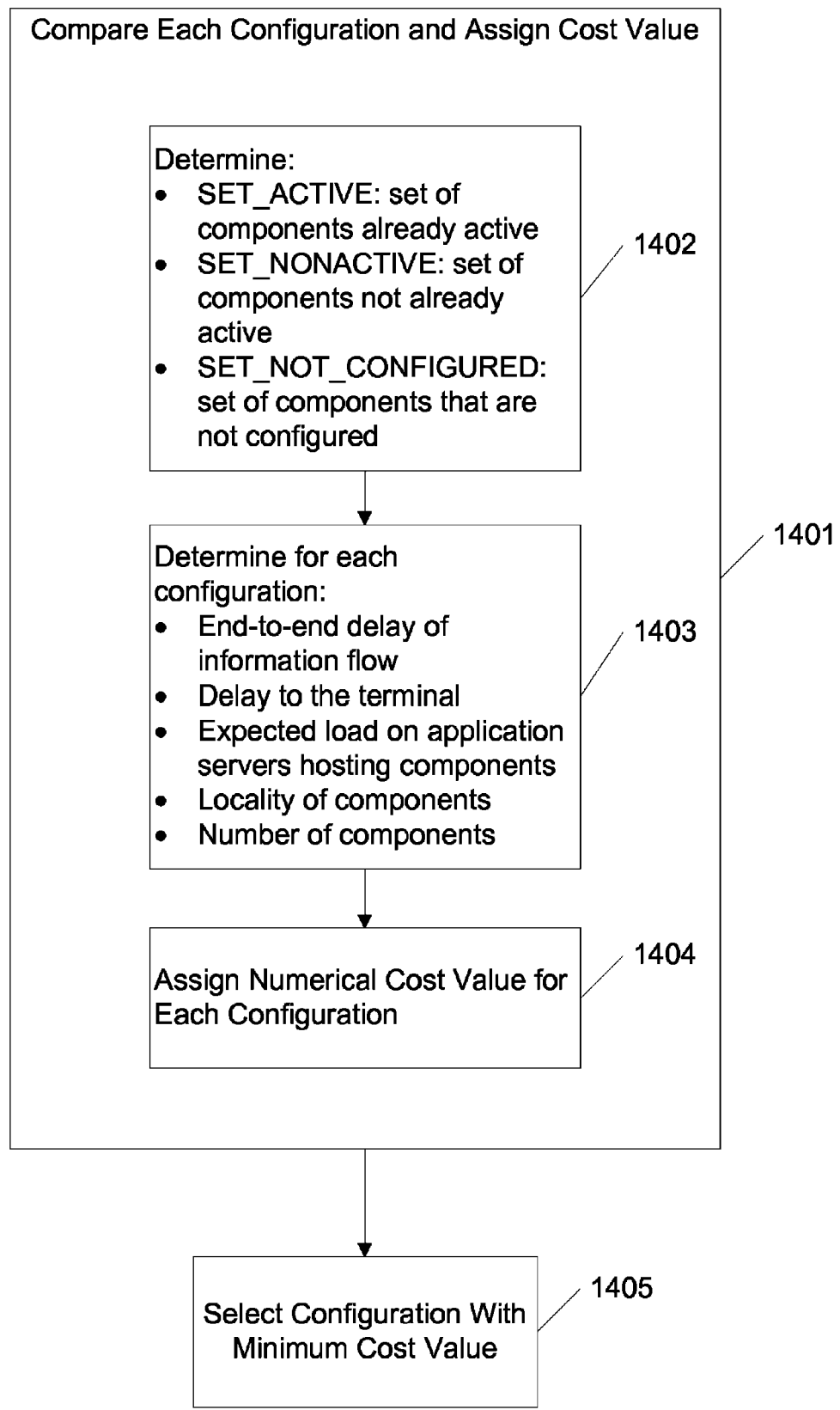
FIG. 14 shows a decision making process in accordance with aspects of the present invention.

FIG. 14 shows additional steps that may be used with step 1306. Step 1306 is represented as procedure 1401 in FIG. 14. First in step 1402, the system determines the set of components that are already active (SET_ACTIVE), the set of components that are not already active (SET_NONACTIVE), and the set of components that are not configured.

In step 1403, the system determines for each configuration an end-to-end delay of the information flow, a delay of sending messages to the user terminal, an expected load on application servers hosting components, the locality of components, and the number of components.

In step 1404, the system assigns a numerical cost value for each configuration.

Next, in step 1405, the system selects the configuration with that minimum cost value.

Figure 15:
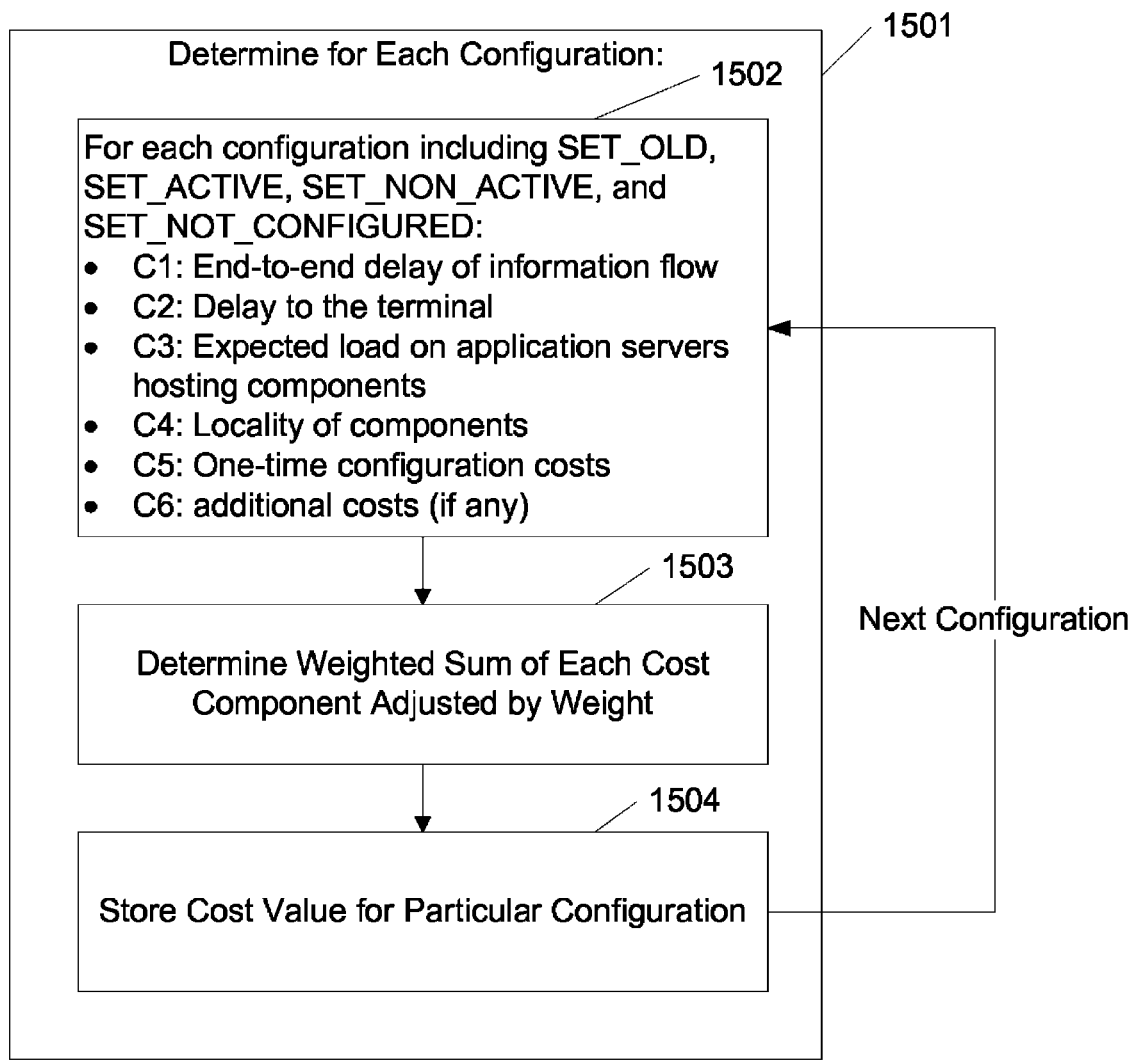
FIG. 15 shows a process for determining costs of a configuration in accordance with aspects of the present invention.

FIG. 15 shows how costs may be calculated for each cost parameter as relating to step 1403 of FIG. 14. In step 1502, for each configuration using the SET_OLD, SET_ACTIVE, SET_NON_ACTIVE, and SET_NOT_CONFIGURED, the system determines:

1) C1: End-to-end delay of information flow
2) C2: Delay to the terminal
3) C3: Expected load on application servers hosting components
4) C4: Locality of components
5) C5: One-time configuration costs
6) C6: Additional costs (if any)

In step 1503, the system determines a weighted sum of each cost component adjusted by a weighting factor provided by each of the platforms or provided by a separate system, for instance. In step 1504, the system stores a cost value for a particular configuration. Step 1502 is then repeated for the next configuration of components.

The following table presents various decision parameters that may be used in assigning a cost value to the service component configuration spanning the platforms. Each parameter may have a pre-assigned weight. The weights are expected to be agreed upon by the platform operators and remotely configured by the platform. The agreed-upon weights are expected to be the same for all platforms. However, different platform providers may negotiate different weightings based on various differences between platforms including congestion, quality of service issues, available space, and other issues.

| Parameter/Input | Description |
| --- | --- |
| Composite service specification | A specification that defines how components are connected (a DAG or a chain). The specification includes information about applicable user profiles and reconfiguration rules. The specification identifies which components send information directly to the terminal. The specification contains the interface requirements of the components (metadata). |
| End-to-end delay of information flow | End-to-end delay in milliseconds of the service graph. This is measured by acquiring latency between each component in the graph. The implementation of this measurement technique is outside the scope of this invention. It is expected that for simplicity, latency is only measured when the platform changes and two components in the same platform have latency of zero. |
| Information delivery delay to the terminal | This is the end-to-end latency from any component that delivers information directly to the terminal. These components must be specified in the composite service description. |
| Expected load on application servers | The load created by the configuration must be taken into account. This parameter captures this cost. Load can be expressed in many ways. One may assume that a numerical value can be assigned for each component how much it uses the application server's resources. This number is assigned by the component developer after the component has been tested. |
| Locality of components | It may be preferred that the system should maximize the number of local components. This parameter captures the number of local components in the composed service (in the new platform). If this is preferred, this parameter can be given a high weight factor. |
| One-time configuration cost | This cost involves the one-time configuration and relocation of components that happens only once for a component or for a user. |

Figure 16:
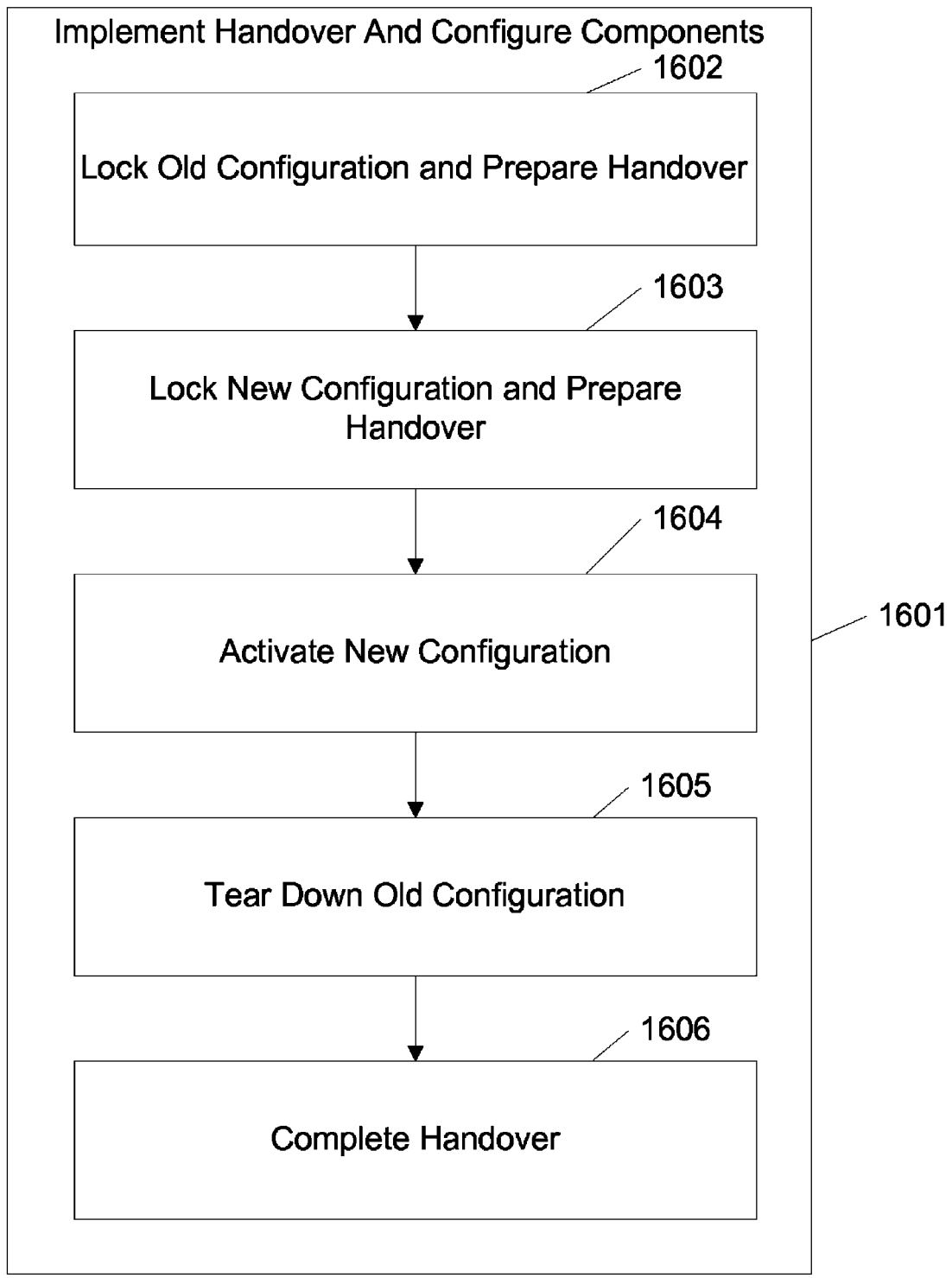
FIG. 16 shows a process for implementing handover in accordance with aspects of the present invention.

FIG. 16 shows how a handover decision for a new service configuration may be implemented and executed. FIG. 16 relates to step 908 of FIG. 9 as represented by step 1601. In step 1602, the system locks the old configuration and prepares for handover. Next in step 1603, the system locks the new configuration and prepares for handover. In step 1604 the system activates the new configuration. In step 1605, the system tears down the old configuration. Finally, in step 1606, handover is completed.

III. State Locking

A. Overview of State Locking

One problem is how to manage the run-time reconfiguration of the service composition. An old configuration cannot be discarded before the new configuration has taken effect. This means that a locking protocol is needed to guarantee that a new distributed service delivery configuration has been installed.

Two situations are addressed below: a client-driven reconfiguration and a server-driven reconfiguration. In the first, the client has formulated a plan to change the service usage pattern. In the second, a controller component residing in the service platform formulates this reconfiguration plan. The same component locking mechanism can be used for both cases.

As described above, the service components can be viewed as forming a chain of services or a DAG (directed acyclic graph).

The following presents an example to illustrate a service consisting of composed components. Here, a spam filter service is composed with a translation service and an email service to provide an enhanced email service, where the emails are sent first to the spam filter, then to the basic mail service and then are translated to a suitable format if needed. Thus, three components may be used to provide this service for end users. See FIG. 19, with email message 1901 being sent to standard e-mail service component 1902. Standard e-mail content can be sent to user terminal 1903. An enhanced service of the delivery of an enhanced e-mail content may be provided by an enhanced e-mail service component 1904, spam filter A component 1905, standard e-mail service component 1902, and translation service component 1906.

Next, a new spam filter B component, which provides enhanced spam filtering, is introduced. In this example, a user wishes to use spam filter B component 1907 instead of spam filter A component 1905.

In an alternative example, one may desire to make a chain of additional components by, for example, adding a new component. In one example, one may add a blacklist filter, which checks the validity of each message against a distributed blacklist. This filter component can be added before the existing spam filter A component 1905, resulting in a chain of 4 components under the enhanced e-mail service component.

The problem is how to configure the components in such a way that the email service sends message first to the blacklist filter and then to the spam filter. The key challenge is how to do this at run-time.

B. Procedures for State Locking

The following provides a procedure for state locking in accordance with aspects of the present invention. One aspect of the present invention is to lock the current service component configuration (assumed to be a directed acyclic graph) with a special LOCK message containing an identifier token and possible security token. The message may also contain a reference to the current service component configuration pertaining to the identifier. This design allows end-user specific service component configurations. The mechanism can thus be used by administrators to configure global services and by end-users to configure personalized services.

The four phases of the locking aspect of the invention may be considered as follows:
1) Lock new components not present in old configuration.
2) Lock old configuration. This means that each component in the old configuration prepares for a change in the configuration. The new configuration is introduced at each component.
3) Establish new configuration. Activate new configuration.
4) Teardown old configuration.

In the first phase, the LOCK message is sent to all new components and they reply with LOCK_ACK.

In the second phase, the LOCK message is sent by the first component (or a controller component if there are many) and propagated by each component until there are no further next-hop destinations. Each component checks if the LOCK message bears new configuration information for them. If new configuration for the component is detected, the component prepares to install this configuration. If a component cannot send the LOCK message, it will respond with an LOCK_ACK message. The LOCK_ACK messages are propagated on the reverse-path of the LOCK messages and they will reach the component that sent the first LOCK messages. LOCK_ACK is not propagated by a component when all of its subtree components have responded with the LOCK_ACK message.

In the third phase, the new configuration is established by propagating an UNLOCK message through the new configuration in a similar manner as in phase 2. This will result in UNLOCK_ACK messages.

In the fourth phase, the old configuration is removed by sending a FINALIZE message through the old configuration. Only components that are in the old configuration but not in the new configuration execute the teardown operation.

A special FAILURE message is used for failure notification. Identifier and configuration specific conflict detection is used.

Figure 17:
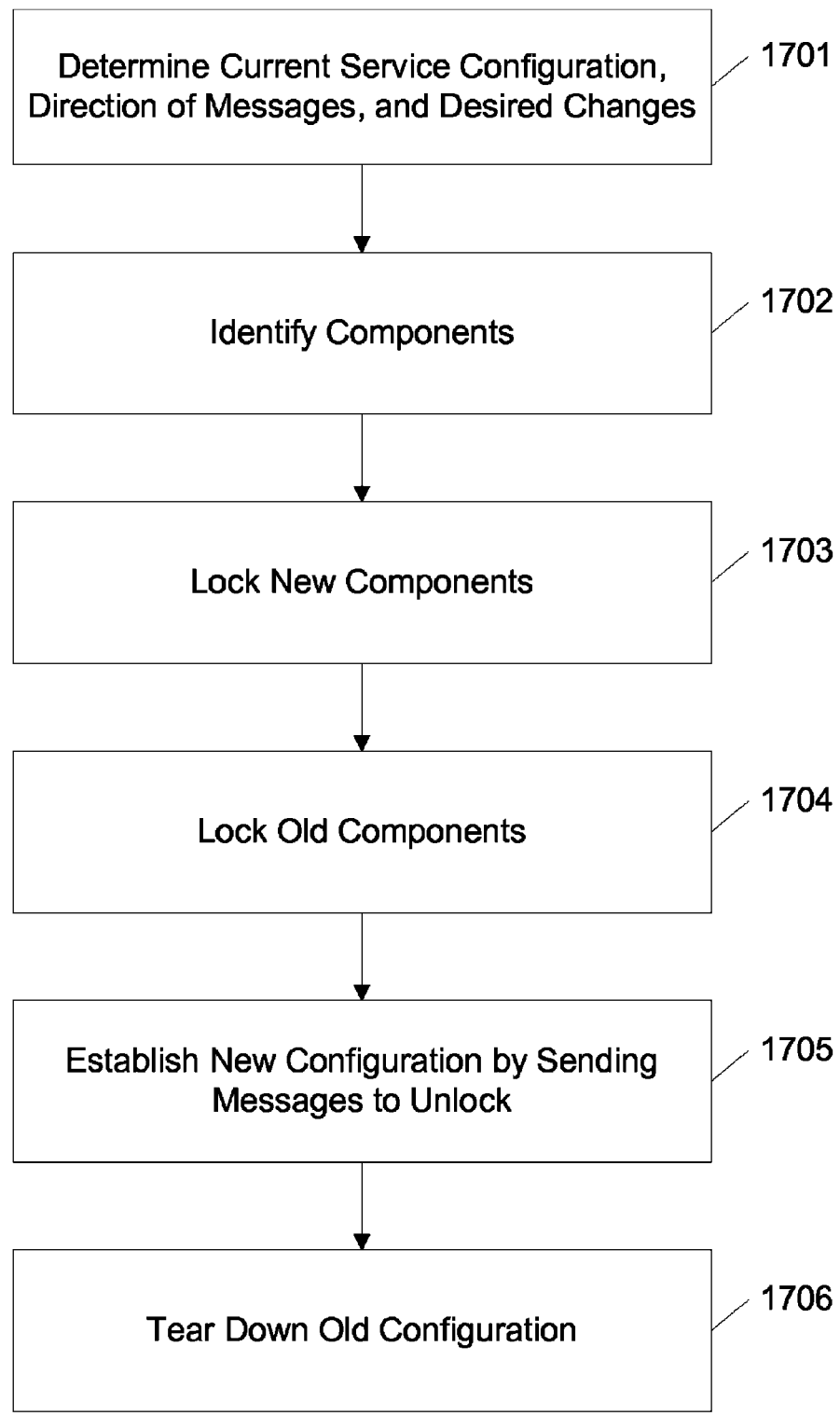
FIG. 17 shows a process including locking of components in accordance with aspects of the present invention.

The LOCK, LOCK_ACK, UNLOCK, UNLOCK_ACK, FINALIZE, and FAILURE messages may be short or may contain one or more of the following pieces of information:
  Message type
  Ultimate source (the coordinator/manager)
  Source, Target
  Service token (identifier), and optional security token
  Timeout
  Message forwarding history These aspects are shown with respect to FIGS. 17 and 18. In FIG. 17, in step 1701, the system determines current service configuration, and the direction of messages, and desired changes. As a result one has the old and new configurations as graphs. This information is represented by a DAG data structure in the message. The graph may be compressed to keep message size small.

Next, in step 1702, the system identifies a first component or components that should be contacted. In step 1703, the system sends a LOCK message to lock the new components in their current state.

Next, in step 1704, the system locks the old components. Next, in step 1705, the system establishes a new configuration by sending messages to unlock the locked components. Finally, in step 1706, the system tears down the old configuration.

Various systems using unlock messages may be used to provide the unlocking of the locked components in step 1705.

Alternatively, one may use other signaling approaches to allow the components to unlock to continue to provide services to the user.

It is appreciated that locking the new configuration or locking the old configuration first is not critical. Rather, it is beneficial if both configurations are locked before any changes are made. It is expected that the old configuration is easy to lock (or may be implicitly locked). Locking of the new configuration may take more time. The locking of the systems may be performed concurrently or sequentially as desired.

Figure 18:
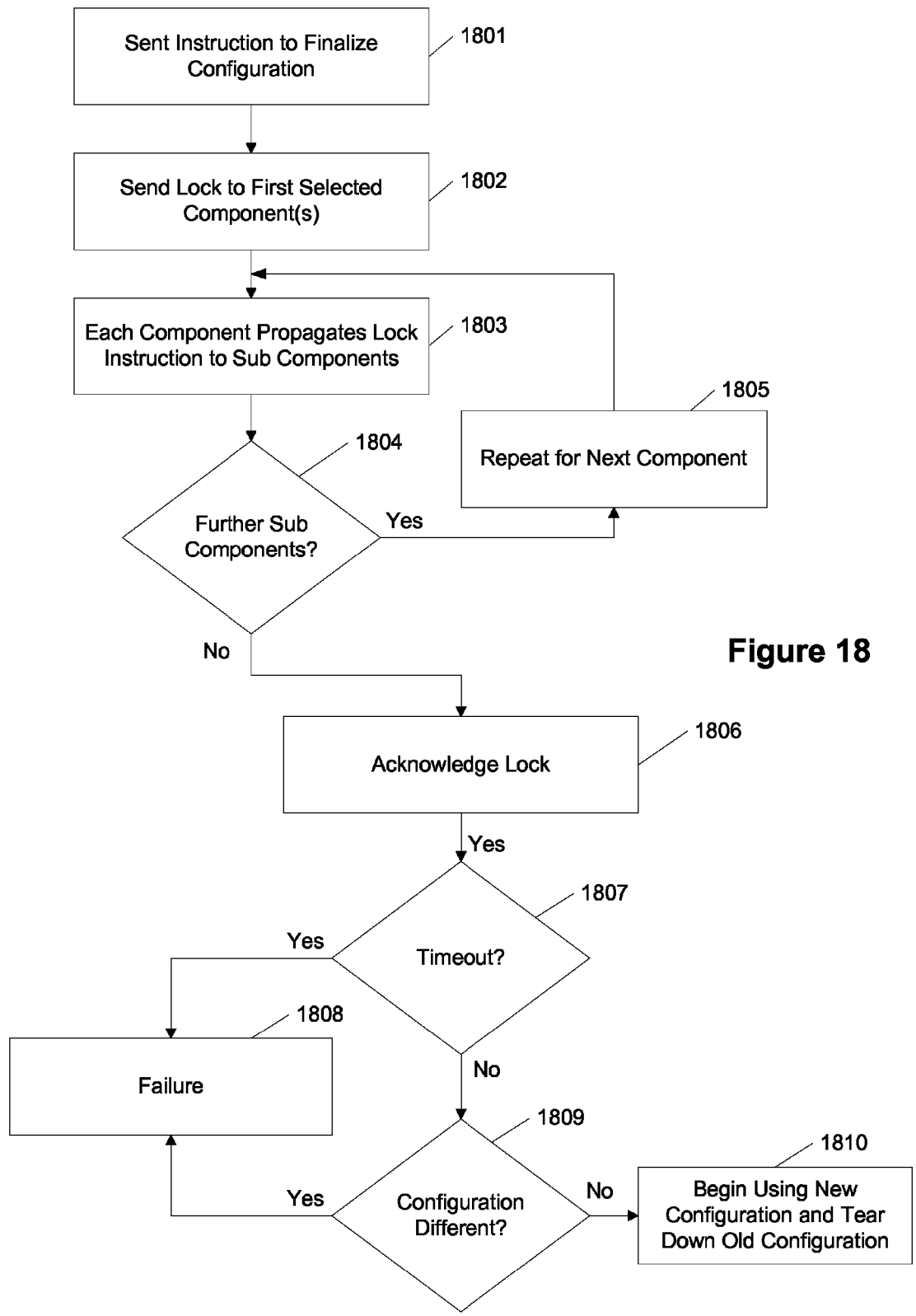
FIG. 18 shows a process that locks and unlocks components to handoff services in accordance with aspects of the present invention.

FIG. 18 shows the process for walking through composite groupings of components to allow the locking and unlocking for transitioning from old configurations to new configurations.

In step 1801, the system has been sent an instruction to finalize a new configuration. In step 1802, the system sends a LOCK command to a first selected component or components. Next in step 1803, each component propagates the lock construction to sub components. In step 1804, the system determines if there are additional subcomponents. If there are additional subcomponents, the procedure is repeated in step 1805 for all of the subcomponents.

Next, after all subcomponents have been locked, the components acknowledged the lock in step 1806. Two system checks may be used at this point including a timeout check in step 1807 and a different configuration check in step 1809. If either one of these has occurred, then the handover process has failed as shown in step 1808. Otherwise, the system begins to use the new configuration and tear down the old configuration in step 1810.

Figure 19:
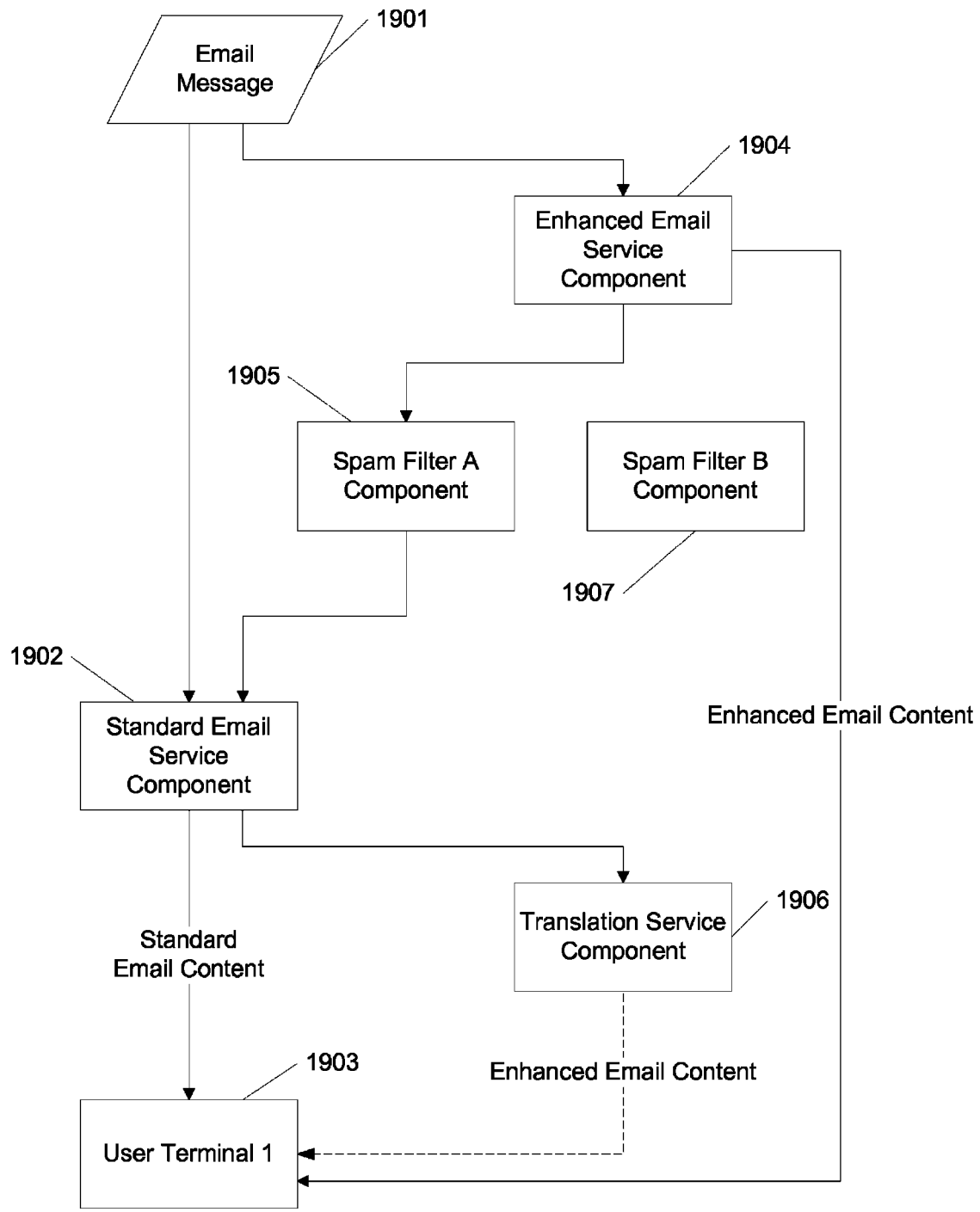
FIG. 19 shows a services provided by components in accordance with aspects of the present invention.

FIG. 19 shows an example of this procedure being used where a user terminal switches platforms and needs to use a new spam filter in place of an old spam filter. Here, an e-mail message 1901 is forwarded to an enhanced e-mail service component 1904. The enhanced e-mail service component 1904 sends the e-mail to spam filter A component 1905. The filtered e-mail is then sent to standard e-mail service component 1902 and then sent to translation service component 1906, if needed. The enhanced e-mail content may then be returned back up the chain of components to enhanced e-mail service component 1904 and forwarded to user terminal 1 1903. Alternatively, the translation service components 1906 may forward the enhanced e-mail content to user terminal 1 1903 directly as shown by the broken arrow.

FIGS. 20A-20G described the actual procedural locking and unlocking of the various components. First in FIG. 20A, lock 1 is sent from an enhanced e-mail service component 1904 to the new spam filter B component 1907. Next, lock 2 is sent from spam filter B component 1907 to standard e-mail service component 1902. The standard e-mail service component 1902 then sends lock 3 to the translation service component 1906.

Figure 20A:
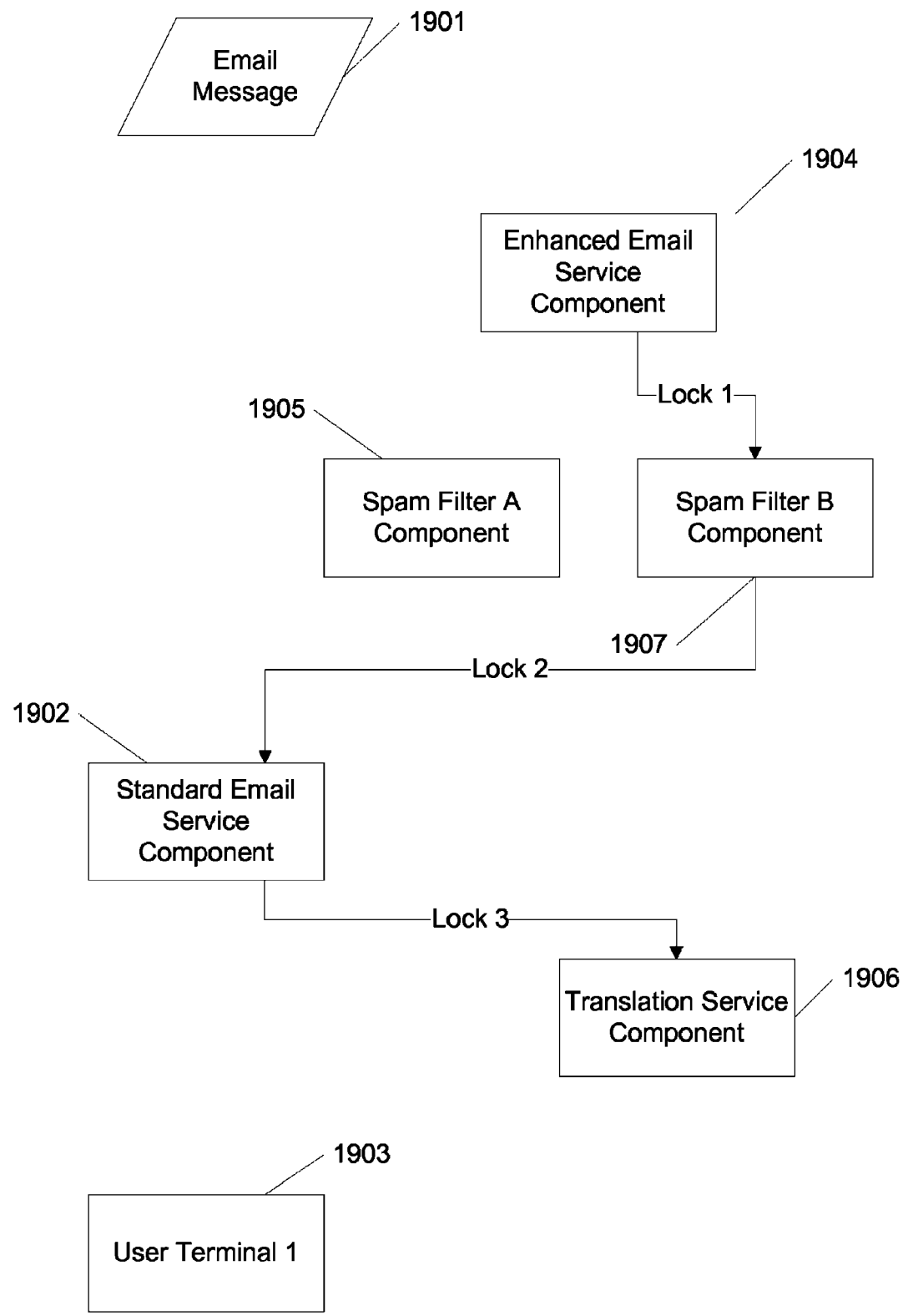
FIGS. 20A-20G shows a process for changing components for a service for a user terminal in accordance with aspects of the present invention.
Figure 20B:
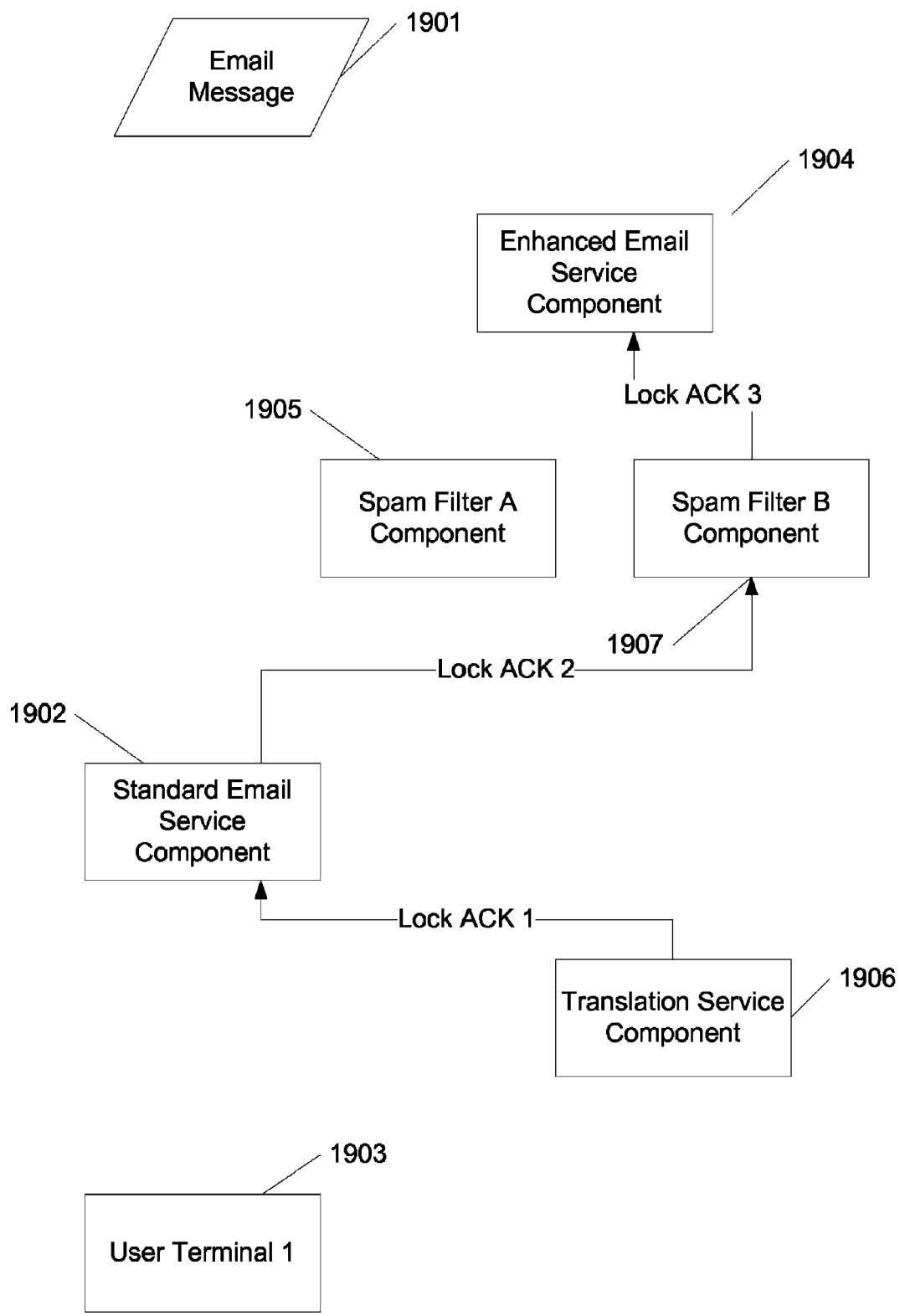

As shown in FIG. 20B, the translation service component 1906 has no subcomponents and so replies with the lock acknowledgment signal lock ACK 1 to the standard e-mail service component 1902. The lock ACK signal is then transmitted upstream as lock ACK 2 to spam filter B component 1907. Finally, lock ACK 3 reaches enhanced e-mail service component 1904.

Figure 20C:
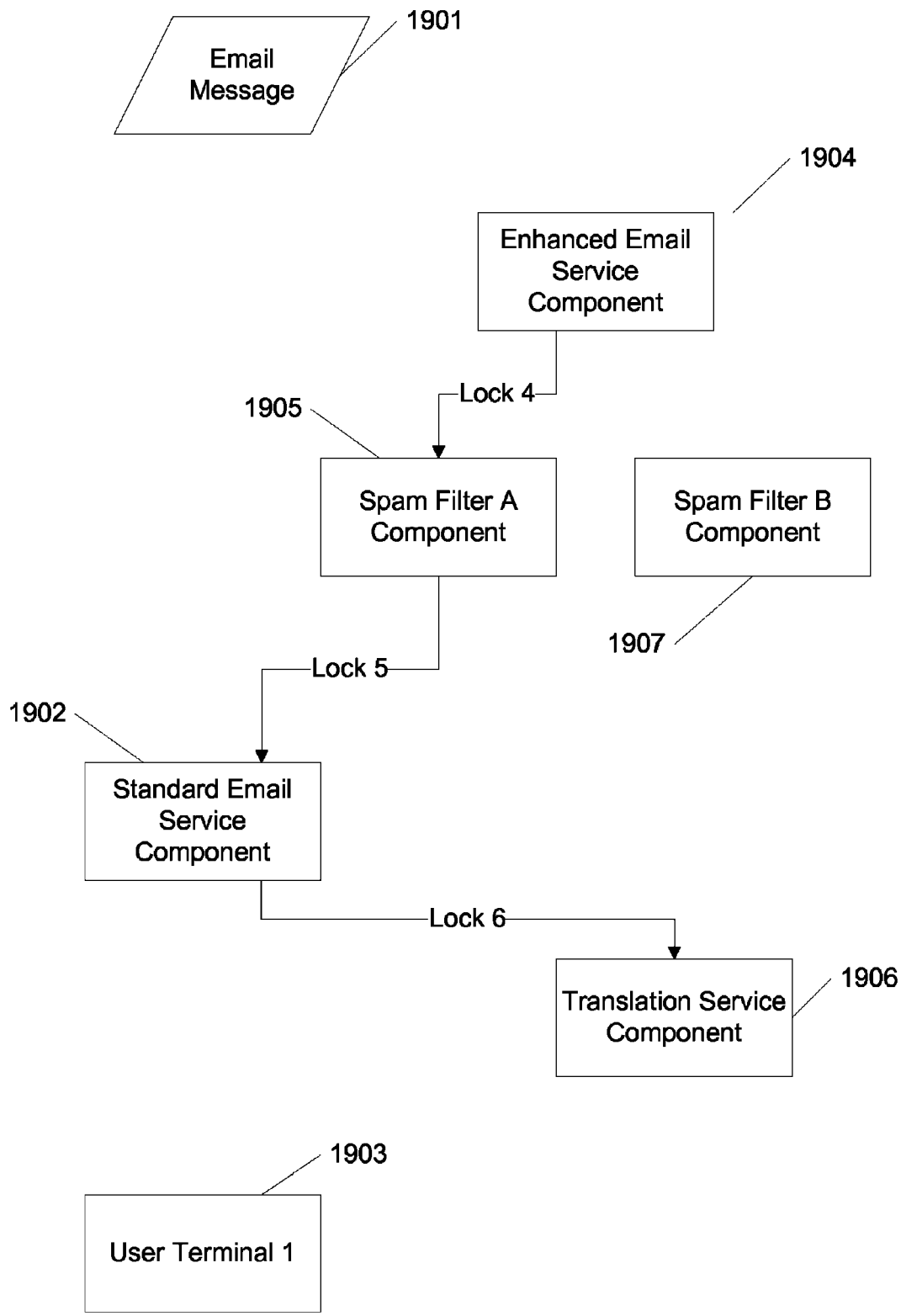

As shown in FIG. 20C, a new lock set of signals are sent through the old group of components using spam filter A 1905. Here, the locks are lock 4, lock 5, and lock 6.

Figure 20D:
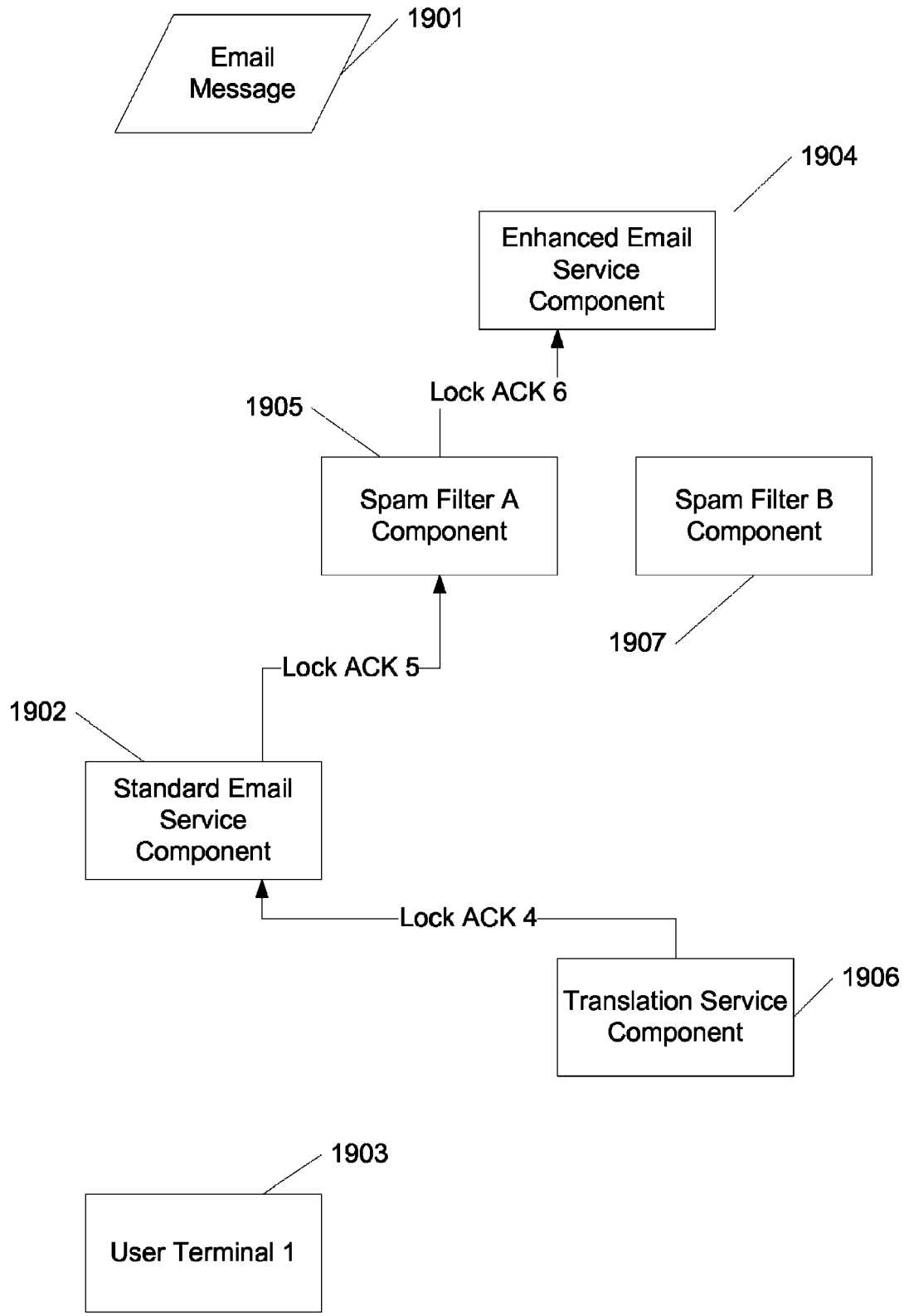

As shown in FIG. 20D, the lock acknowledgement signals are sent upstream as lock ACK 4, lock ACK 5, and lock ACK 6.

Figure 20E:
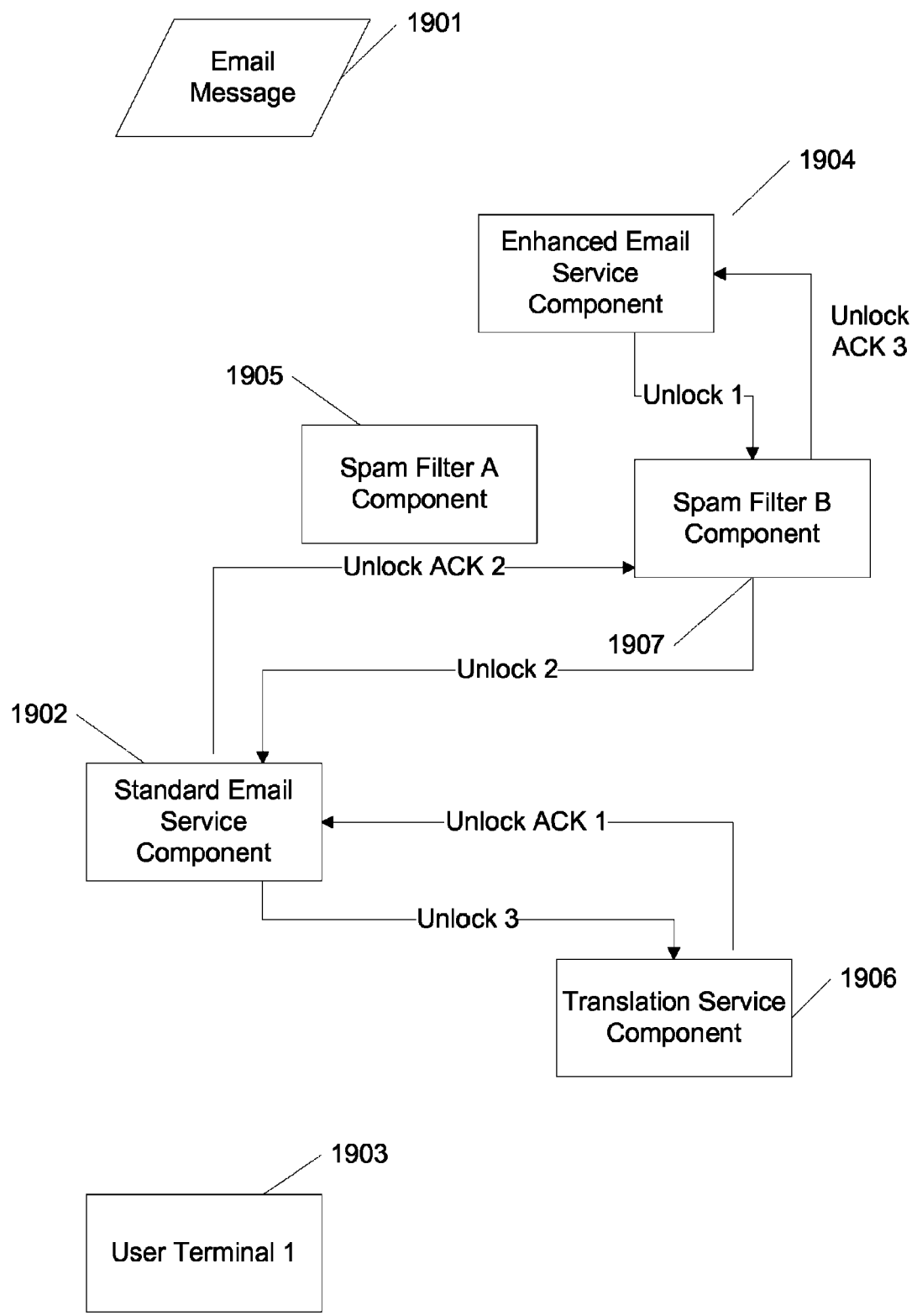

Next, as shown in FIG. 20E, unlock signals 1-3 are sent through spam filter B component 1907, standard e-mail service component 1902, to translation service component 1906. The return unlock ACK signals 1-3 are returned up the return path to the enhanced e-mail service component 1904.

Figure 20F:
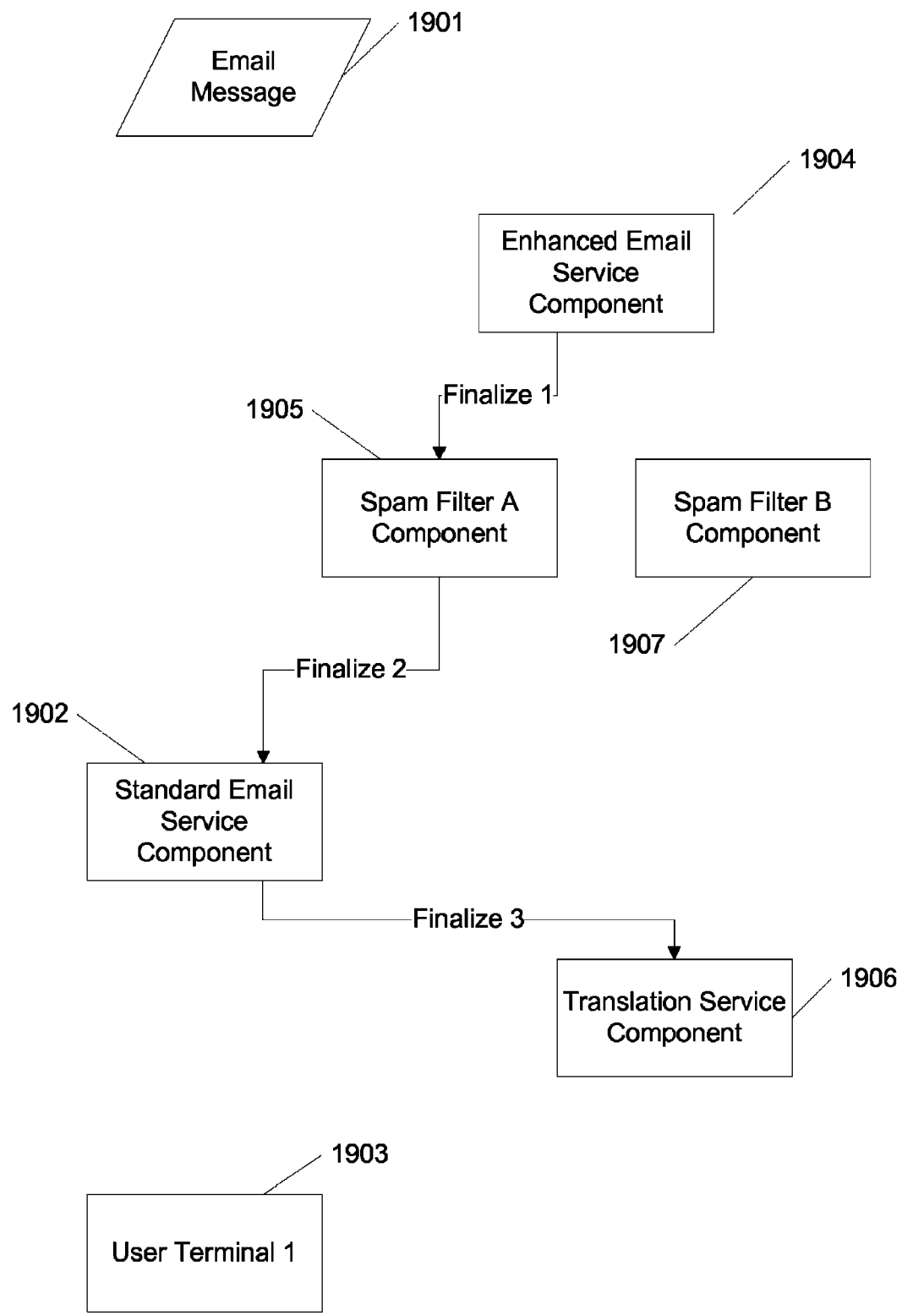

In FIG. 20F, finalize signals 1-3 are sent through the chain of spam filter A component 1905 to translation service component 1906 to indicate that these components, if not reused, should be released from the current configuration.

Figure 20G:
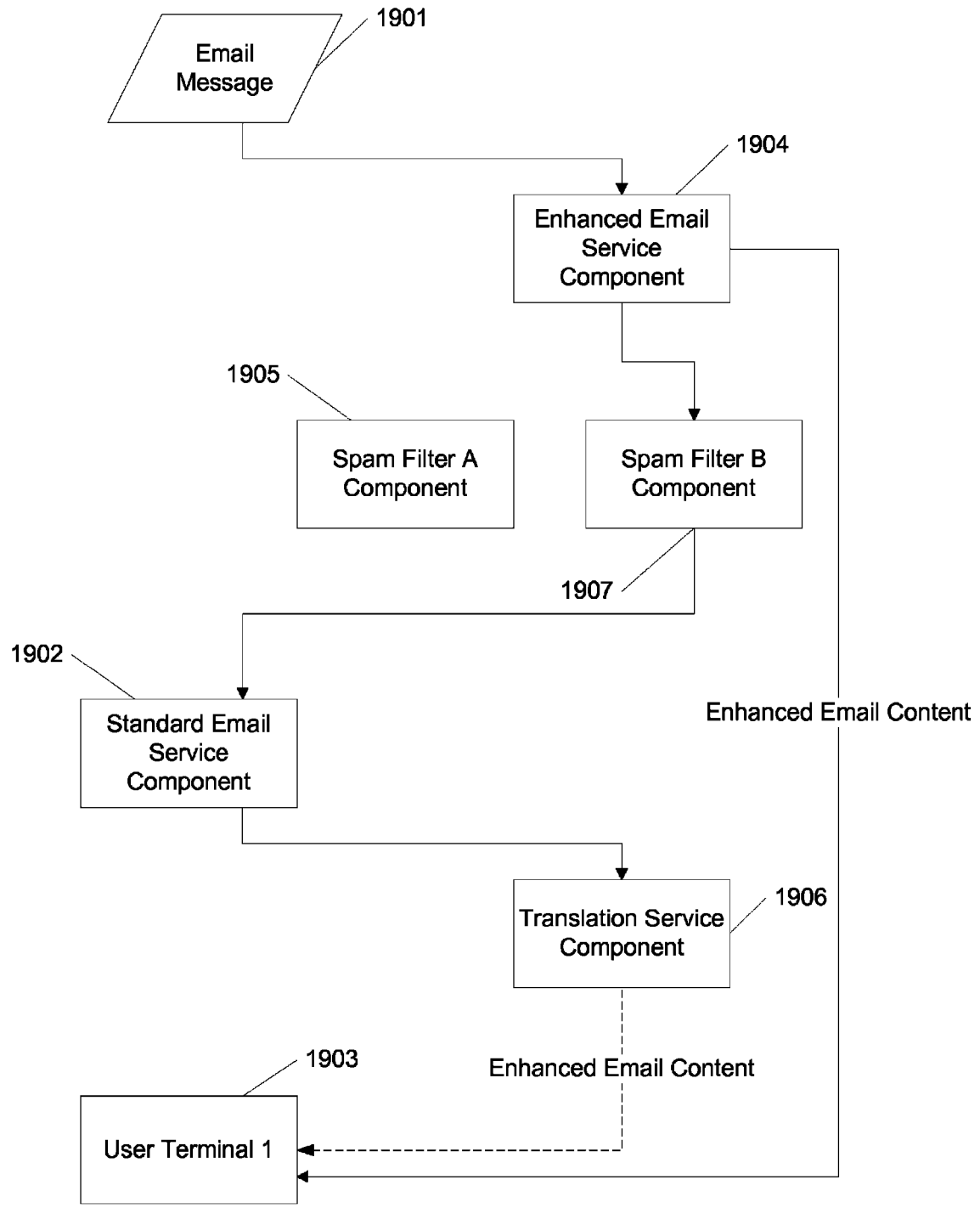

FIG. 20G shows the end result where enhanced e-mail service component 1904 now uses the spam filter B component 1907 in place of spam filter A component 1905.

With respect to the finalize signals of FIG. 20F, it is noted that only the nodes that are not in the new configuration process the finalize message. Other nodes may participate in the new and old configurations. The nodes that are in the new configuration do not process the finalize message but rather forward to subsequent nodes for possible processing.

With respect to the lock messages, each lock message is propagated by each component until there are no more further components. If there are many outgoing destinations, the lock message may be replicated. Each lock message may contain a history of the previous components (for instance, their addresses in the distributed system).

If there are no further outgoing destinations, the component generates a lock ACK message sent on a reverse path of the lock message. If a current time is greater than the timeout value, then a failure message will be generated. If a current configuration differs from the current configuration identified in the lock or lock acknowledgment message, a failure message will be generated that will stop the handover process.

Upon receiving the FAILURE message, the initiator component will broadcast FAILURE to any components that have been contacted so far. This is not totally necessary, because timeouts will eventually remove any locks.

The following describes failure handling. The reconfiguring mechanism may fail at a number of places including:
- During LOCK propagation (phase 1 (lock new) and 2 (lock old))
- During LOCK_ACK propagation (phase 1 (new) and 2 (old))
- During UNLOCK propagation (phase 3 (new))
- During UNLOCK ACK propagation (phase 3 (new))
- During FINALIZE propagation (phase 4 (old))
- During FAILURE propagation Possible failures can be resolved by the initiating component upon receiving FAILURE. Timeouts ensure eventual termination of the reconfiguration process and the eventual removal of state.

The following provides a state analysis of the components.
- The processing of each LOCK message creates state at the component, including a timer.
- The processing of each UNLOCK message creates state at the component, including a timer.
- The UNLOCK_ACK message does not create state. It removes existing state established by LOCK and UNLOCK.
- The FINALIZE message does not create state. It removes existing state established by LOCK.

This mechanism guarantees that the new spam filter component is ready and active for processing new mail.

The mechanism also guarantees that the current service is provided as long as the new component is being configured in the composed service. The locked configuration can still forward mail.

The lock and unlock procedure may provide a number of benefits to the system including allowing run-time configuration of service composed of components where they:

Can be used for service management and service delivery optimization

Can be used for components in different administrative domains (or platforms)

Can be used by both administrators for global service management and end-users for personalized service management Also, state is maintained consistently by locking all components The locking mechanism guarantees that reconfiguration is properly performed and state information is not corrupt.

This feature is used in service management operations. It is expected that this mechanism would be visible in how management and deployment of service components is performed at the boundary between service platforms and the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A method, comprising:
identifying components of one or more services being provided to a user terminal;
constructing a distribution model of the components that defines a distribution of the components over one or more platforms; and
while preserving one or more states of the components, coordinating handover of the components between the one or more platforms in accordance with the distribution model of the components.

2. The method of claim 1, wherein constructing the distribution model includes:
obtaining an agreement between platforms hosting the components; and
obtaining one or more constraints regarding the components;
wherein the distribution model is constructed based on the one or more constraints.

3. The method of claim 1, further comprising:
based on the distribution model, transferring a first component of the components from a first platform to a second platform of the one or more platforms;
activating a component configuration that includes the transferred first component;
informing the user terminal that a service is active; and
providing the service to the user terminal using the transferred first component.

4. The method of claim 1, wherein, during the handover, all of the components migrate to a new platform.

5. The method of claim 1, wherein a first component of the components remains on a particular platform of the one or more platforms and a second component migrates to a different platform of the one or more platforms, wherein the first component and the second component provide data for the same composite service.

6. The method of claim 1, further comprising:
determining whether the components are covered by a service agreement; and
stopping the handover upon determining that the components are not covered by the service agreement.

7. The method of claim 1, further comprising:
determining whether a user terminal has undergone a change in service within a time window; and
stopping the handover upon determining that the user terminal has undergone a change in service within the time window.

8. The method of claim 1, further comprising:
during the handover, determining a better configuration of components than a current configuration of components; and
upon determining the better configuration, performing a process that changes the current configuration of components to a different configuration of components.

9. The method of claim 1, further comprising:
determining a set of components that are available in a first platform;
creating a first set that identifies components that only exist in a second platform; and
creating a second set that identifies components that exist in both the second platform and the first platform.

10. The method of claim 9, further comprising:
determining a third set that identifies only components from the second set that are covered by a service agreement.

11. The method of claim 10, further comprising:
determining that the service agreement allows reconfiguration; and
upon determining that the service agreement allows reconfiguration, determining a fourth set that identifies only components that are able to be reconfigured.

12. The method of claim 1, further comprising:
generating a first composite service configuration that includes a set of components; and
determining a cost value for the first composite service configuration.

13. The method of claim 12, further comprising:
comparing the first composite service configuration with one or more additional composite service configurations based on cost values; and
selecting the composite service configuration with a minimum cost value.

14. The method of claim 12, wherein determining the cost value for the first composite service configuration includes a determination of an end-to-end delay of information flow, a determination of a delay to the terminal signal flow, a determination of an expected load on application servers hosting components, a determination of a locality of components, and a determination of a number of components.

15. The method of claim 13, wherein the cost values include determined weighted cost values.

16. The method of claim 1, further comprising:
locking a first set of components to their current state, the first set of components corresponding to a first configuration;
locking a second set of components to their current state, the second set of components corresponding to a second configuration that is different than the first configuration;
establishing the second configuration by sending messages to unlock the second set of components; and
tearing down the first configuration.

17. The method of claim 1, further comprising:
sending a lock message to a first component, wherein the lock message is propagated to one or more subcomponents of the first component.

18. The method of claim 17, further comprising:
receiving an acknowledgement indicating that the first component is locked.

19. A system comprising:
one or more servers configured to operate as a corresponding number of service platforms for a service provider that provides a composite service to a user terminal; and
a computing device configured to:
identify components of the composite service being provided to the user terminal, the components residing on at least one of the one or more servers;
construct a distribution model of the components that defines a distribution of the components over the one or more servers and
while preserving one or more states of the components, coordinate handover of the components between the one or more servers in accordance with the distribution model of the components.

20. The system according to claim 19, wherein the computing device is configured to coordinate a handover that is initiated upon the user terminal switching between a first server of the one or more servers and a second server of the one or more servers, the switch occurring based on a change in preferences.

21. The system according to claim 19, wherein the computing device is configured to coordinate a handover that is initiated upon the user terminal switching between a first server of the one or more servers and a second server of the one or more servers, the switch occurring based on a change in location of the user terminal.

22. A non-transitory computer-readable medium storing computer-readable instructions that, when executed, cause a computing device to:
identify components of one or more services being provided to a user terminal;
construct a distribution model of the components that defines a distribution of the components over one or more platforms; and
while preserving one or more states of the components, coordinate handover of the components between the one or more platforms in accordance with the distribution model of the components.

23. The non-transitory computer-readable medium according to claim 22, wherein constructing the distribution model includes:
obtaining an agreement between platforms hosting the components; and
obtaining one or more constraints regarding the components;
wherein the distribution model is constructed based on the one or more constraints.

24. The non-transitory computer-readable medium according to claim 22, further storing computer-readable instructions that, when executed, causes the computing device to:
based on the distribution model, transfer a first component of the components from a first platform to a second platform of the one or more platforms;
activate a component configuration that includes the transferred first component;
inform the user terminal that a service is active; and
provide the service to the user terminal using the transferred first component.

25. A server comprising:
memory storing computer-readable instructions that, when executed, cause the server to at least:
identify components of one or more services being provided to a user terminal;
at least partially construct a distribution model of the components that defines a distribution of the components over one or more platforms; and
while preserving one or more states of the components, coordinate handover of the components between the one or more platforms in accordance with the distribution model of the components.

26. The server according to claim 25, wherein the computer-readable instructions, when executed, further cause the server to interact with another server when performing the steps of at least partially constructing the distribution model of the components and coordinating the handover of the components.

27. The server according to claim 26, wherein the memory further stores computer-readable instructions that, when executed, cause the server to use a cost analysis to determine how the components are to be distributed over the one or more platforms.

28. The server according to claim 25, wherein the memory further stores computer-readable instructions that, when executed, cause the server to compute a weighted cost for all components associated with said a composite service.

29. The server according to claim 28, wherein the memory further stores computer-readable instructions that, when executed, cause the server to access weights that have been agreed upon by platform operators and use the weights to compute the weighted cost.

* * * * *